United States Patent
Aissi

(10) Patent No.: US 9,867,043 B2
(45) Date of Patent: Jan. 9, 2018

(54) SECURE DEVICE SERVICE ENROLLMENT

(71) Applicant: Visa International Service Association, San Francisco, CA (US)

(72) Inventor: Selim Aissi, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 329 days.

(21) Appl. No.: 14/011,027

(22) Filed: Aug. 27, 2013

(65) Prior Publication Data

US 2014/0066015 A1     Mar. 6, 2014

Related U.S. Application Data

(60) Provisional application No. 61/694,138, filed on Aug. 28, 2012.

(51) Int. Cl.
*H04W 12/06*     (2009.01)
*H04L 29/06*     (2006.01)
(Continued)

(52) U.S. Cl.
CPC ........... *H04W 12/06* (2013.01); *G06F 21/57* (2013.01); *G06F 21/73* (2013.01);
(Continued)

(58) Field of Classification Search
CPC .................................................. H04L 63/0876
See application file for complete search history.

(56) References Cited

U.S. PATENT DOCUMENTS 6,151,643 A * 11/2000 Cheng ..................... G06F 8/62
709/200
8,090,744 B1 * 1/2012 Baird ............... G06F 17/30233
707/791

(Continued)

FOREIGN PATENT DOCUMENTS

JP     2010-097512 A     4/2010
KR     10-2012-0090711 A     8/2012

(Continued)

OTHER PUBLICATIONS

International Search Report and Written Opinion dated Dec. 19, 2013 for International Patent Application No. PCT/US2013/056883, 13 pages.

*Primary Examiner* — Yin-Chen Shaw
*Assistant Examiner* — Darshan Dhruv
(74) *Attorney, Agent, or Firm* — Kilpatrick Townsend & Stockton LLP

(57) ABSTRACT

A secure device enrollment process to enroll a mobile device for access to a service can include receiving an application package including an application used for accessing the service via the mobile device. The application authenticity and the application integrity of the downloaded application are determined. The device integrity of the mobile device is also determined. An automatic enrollment message digest is generated to facilitate enrollment of the mobile device. The enrolment message digest provides an association between the downloaded application, the mobile device, and user identifying information of a user of the mobile device; and is sent to a server associated with a service provider to enroll the mobile device for the service provided by the service provider.

17 Claims, 11 Drawing Sheets

(51) Int. Cl.
*H04W 4/00* (2009.01)
*G06F 21/57* (2013.01)
*G06F 21/73* (2013.01)
*H04W 12/10* (2009.01)

(52) U.S. Cl.
CPC ......... *H04L 63/0876* (2013.01); *H04W 4/003* (2013.01); *H04L 63/123* (2013.01); *H04L 63/1433* (2013.01); *H04W 12/10* (2013.01)

(56) References Cited

U.S. PATENT DOCUMENTS

| | | | | |
|---|---|---|---|---|
| 8,386,773 | B2 | 2/2013 | Sherkin et al. | |
| 8,473,743 | B2 | 6/2013 | Freedman et al. | |
| 8,621,203 | B2* | 12/2013 | Ekberg | H04L 9/321 713/156 |
| 8,818,897 | B1* | 8/2014 | Slodki | G06F 21/121 705/51 |
| 2004/0221174 | A1* | 11/2004 | Le Saint | G06F 21/00 726/9 |
| 2007/0074034 | A1* | 3/2007 | Adams | G06F 21/629 713/176 |
| 2009/0172412 | A1 | 7/2009 | Fascenda et al. | |
| 2009/0204964 | A1* | 8/2009 | Foley | G06F 21/53 718/1 |
| 2009/0307140 | A1* | 12/2009 | Mardikar | G06Q 20/1085 705/71 |
| 2010/0113006 | A1* | 5/2010 | Pajjuri | H04W 24/02 455/423 |
| 2010/0318783 | A1* | 12/2010 | Raj | G06F 21/31 713/150 |
| 2011/0197260 | A1* | 8/2011 | Maes | G06F 21/554 726/3 |
| 2011/0225427 | A1* | 9/2011 | Wood | H04L 9/3263 713/176 |
| 2011/0320823 | A1* | 12/2011 | Saroiu | G06F 21/53 713/189 |
| 2012/0054841 | A1* | 3/2012 | Schultz | G06F 21/44 726/6 |
| 2012/0084203 | A1* | 4/2012 | Mehew | G06Q 20/40 705/41 |
| 2012/0173251 | A1 | 7/2012 | Gillin | |
| 2012/0185928 | A1 | 7/2012 | Suzuki | |
| 2012/0222129 | A1 | 8/2012 | Racciopi et al. | |
| 2012/0266142 | A1* | 10/2012 | Bokhari | G06F 11/3688 717/127 |
| 2012/0331526 | A1* | 12/2012 | Caudle | G06F 21/6209 726/4 |
| 2013/0042231 | A1* | 2/2013 | Davey | G06F 8/61 717/174 |
| 2013/0054454 | A1 | 2/2013 | Purves et al. | |
| 2013/0097682 | A1 | 4/2013 | Zeljkovic et al. | |
| 2013/0167223 | A1* | 6/2013 | Prerna | G06F 21/33 726/18 |
| 2013/0202055 | A1* | 8/2013 | Caliguri | H04W 12/06 375/260 |
| 2013/0227636 | A1* | 8/2013 | Bettini | H04W 4/001 726/1 |
| 2014/0059534 | A1* | 2/2014 | Daum | G06F 8/65 717/172 |
| 2015/0222641 | A1* | 8/2015 | Lu | G06F 21/57 726/1 |
| 2015/0302398 | A1* | 10/2015 | Desai | G06F 8/60 705/41 |

FOREIGN PATENT DOCUMENTS

| | | | | |
|---|---|---|---|---|
| WO | WO 2006/038051 | * | 4/2004 | ............... G06F 1/00 |
| WO | WO 2006/03051 | * | 4/2006 | ............... G06F 1/00 |
| WO | WO2006038051 | * | 4/2006 | |
| WO | WO2013185413 | * | 6/2012 | |

* cited by examiner

SECURE DEVICE SERVICE ENROLLMENT

CROSS-REFERENCES TO RELATED APPLICATIONS

This application is a non-provisional application and claims the benefit of priority of U.S. Provisional Application No. 61/694,138 titled "FRICTIONLESS DEVICE SERVICE ENROLLMENT" filed on Aug. 28, 2012, which is herein incorporated by reference in their entirety for all purposes.

BACKGROUND

As the computing capabilities of mobile devices become more and more powerful, consumers are increasingly using their mobile devices to access the internet and to perform more and more complex tasks. For example, mobile devices are being used in an increasing manner to access services and subscriptions through applications running on mobile devices. These applications enable consumers, for example, to conduct payment transactions, access bank accounts, and access subscribed content. To facilitate access to services and subscriptions via mobile devices, consumers are entrusting their mobile devices and the applications running thereon with sensitive data such as Personal Identifiable Information (for example, birth dates, social security numbers, etc.) and Personal Account Information (for example, credit card numbers, account numbers, passwords, etc.). As a result, mobile devices are becoming a popular and attractive target for viruses, malware, and phishing attempts.

Embodiments of the present disclosure address these and other problems, individually and collectively.

BRIEF SUMMARY

Systems, devices, methods, and computer-readable media are described for enrolling a mobile device for a service. The techniques described herein enrolls the mobile device in a secure manner such that little or no sensitive information is transmitted during the enrollment process. The techniques described herein allow the device enrollment process to be performed in a frictionless manner such that little or no user input is required.

According to some embodiments, the device enrollment process performed by a mobile device may include receiving an application package including an application used for accessing the service via the mobile device downloaded to a mobile device from an application store or service provider. The application authenticity and the application integrity of the downloaded application are determined. The device integrity of the mobile device is also determined. In response to determining that the application is authentic and unaltered, and that the mobile device is in a trusted state, an automatic enrollment message digest is generated to facilitate enrollment of the mobile device. The enrolment message digest provides an association between the downloaded application, the mobile device, and user identifying information of a user of the mobile device; and is sent to a server associated with a service provider to enroll the mobile device for the service provided by the service provider. In some embodiments, the enrollment message digest may include a cryptographic measurement of the application and a digital fingerprint of the mobile device.

According to some embodiments, the device enrollment process performed by a server may include receiving an enrollment message digest to enroll a mobile device. A cryptographic measurement of an application downloaded onto the mobile device, a digital fingerprint of the mobile device. and user identifying information of a user of the mobile device can be derived from the enrollment message digest. The cryptographic measurement can be used to determine whether the application is unaltered, and the digital fingerprint can be used to determine whether the mobile device is in a trusted state. If the application is unaltered, the mobile device is in a trusted state, and the user identifying information identifies an authorized user of the service, the mobile device is enrolled for the service, and a user will then be able to access the service via the mobile device through execution of the downloaded application.

According to some embodiments, a mobile device being enrolled for a service can include a processor and a computer readable storage medium storing code, which when executed by the processor, causes the mobile device to perform the operations to enroll the mobile device. The operations can include generating a cryptographic measurement of an application downloaded onto the mobile device, generating a digital fingerprint of the mobile device, and generating an enrollment message digest based on the cryptographic measurement of the application, the digital fingerprint of the mobile device, and user identifying information of a user of the mobile device. The enrollment message digest is sent to a server associated with a service provider to enroll the mobile device for access to a service provided by the service provider.

Some embodiments also encompass a system that includes a mobile device (e.g., as described above) and a server to facilitate the device enrollment process. The server can be configured to receive the enrollment message digest from the mobile device, derive the user identifying information from the enrollment message digest, and enroll the mobile device for access to the service provided by the service provider based on the user identifying information.

The foregoing has outlined rather broadly the features and technical advantages of examples according to the disclosure in order for the detailed description that follows to be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Figure 1:
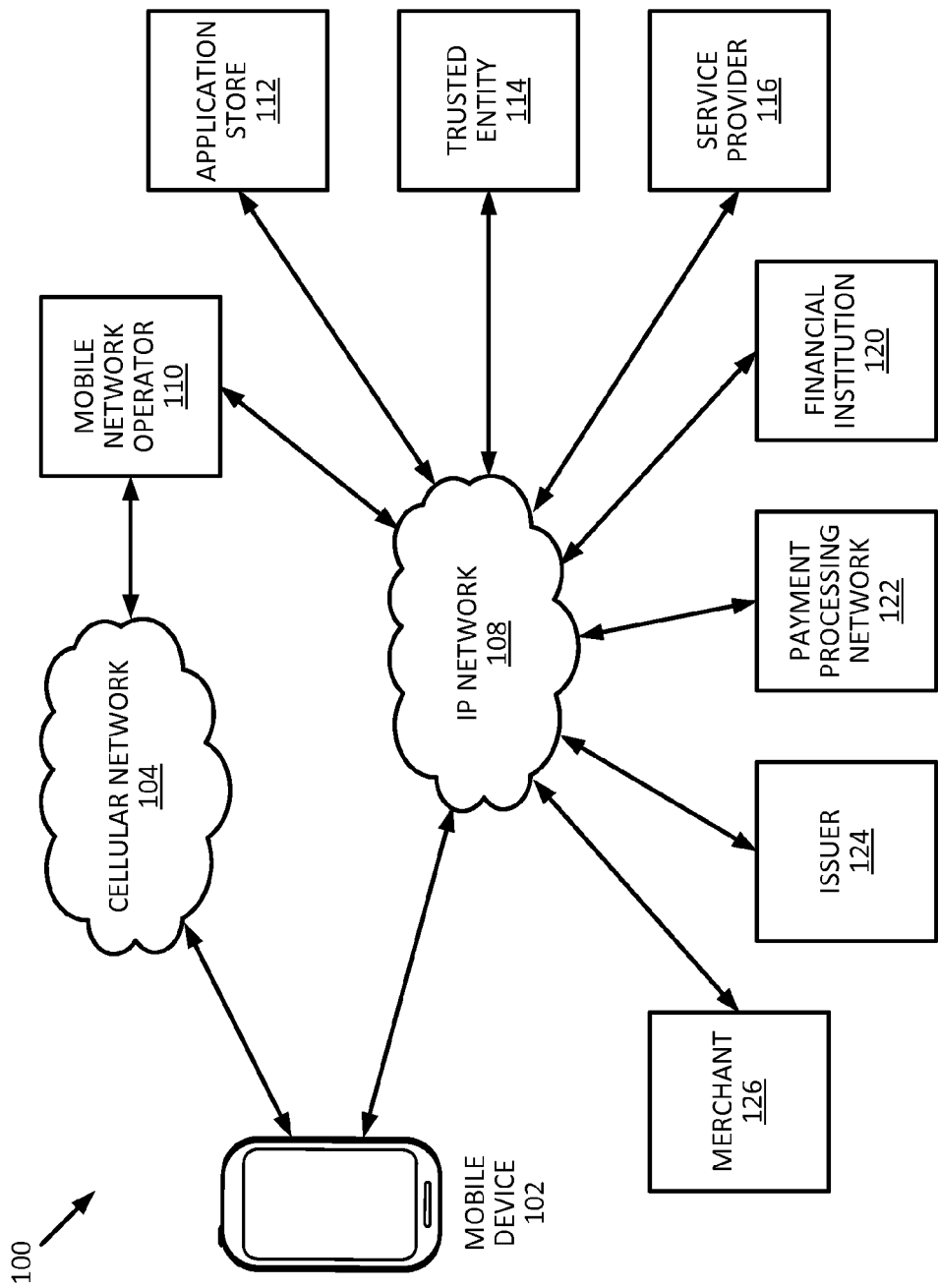
FIG. 1 illustrates an exemplary system with at least some of the entities in communication with a mobile device according to some embodiments of the invention.

Embodiments of the present disclosure provides systems, devices, methods, and computer-readable media to securely enroll a mobile device for services accessed via the mobile device. Currently, enrolling a mobile device to access a service from a service provider may require downloading an application from an application store and performing a number of cumbersome steps before the user can access the service via the mobile device. For example, after a user downloads and installs a mobile banking or mobile payment application onto a mobile device, the user may be required to enter sensitive information about the user such as a user's primary account number before the application can be used. If the downloaded application has been hacked or contains malicious code, or if the mobile device itself has already been infected with a virus or malware, the user's entry of sensitive information can be captured by the malicious code or malware, and be transmitted to a unauthorized party without knowledge of the user.

To reduce such risks and to improve the device enrollment process, the techniques described herein allow a mobile device to verify the authenticity and integrity of the downloaded application as well as the integrity of the mobile device before the downloaded application is installed and executed on the mobile device. Furthermore, to limit the amount of sensitive information transmitted from the mobile device during the enrollment process and to reduce the number of cumbersome manual enrollment steps, the techniques described herein automatically generates a message digest that is sent to a service provider server to enroll the mobile device for the service with little or no input from the user. The message digest can include an association (e.g., cryptographic binding) of the downloaded application, the mobile device, and a minimal amount of user identifying information. The service provider can use the message digest to verify the authenticity and integrity of the downloaded application, the integrity of the device, and the identity of the user before enrolling the mobile device for the service. In some embodiments, the device enrollment process is performed prior to installing the application on the mobile device, and thus isolating the downloaded application entirely from the device enrollment process. In other words, in some embodiments, the downloaded application can be installed only after the service provider has verified the trustworthiness of the downloaded application and the mobile device. In such a manner, the downloaded application does not have access to any of the communications sent or received during the device enrollment process including any sensitive information that may be transmitted or received. Once the service provider has successfully enrolled the mobile device for the service using the automatically generated message digest, the downloaded application can be installed and executed, and a user can then promptly use the application to access the service via the mobile device without having to go through a cumbersome manual device enrollment process.

Prior to discussing the various embodiments of the present invention, a description of some terms may be helpful for a better understanding of the various.

As used herein, a "mobile device" may comprise any electronic device that may be transported and operated by a user, which may also provide remote communication capabilities to a network. The mobile device may be configured to transmit and receive messages or communications to and from a server computer and display the messages on a display screen on the mobile device. Examples of mobile devices include mobile phones (e.g. cellular phones), PDAs, tablet computers, net books, laptop computers, personal music players, hand-held specialized readers, etc.

A "server" or "server computer" may typically be a powerful computer or cluster of computers. For example, the server computer can be a large mainframe, a minicomputer cluster, or a group of servers functioning as a unit. In one example, the server computer may be a database server coupled to a web server.

A "user" may be an entity, such as, an individual that may be associated with one or more payment accounts and/or mobile devices. The user may be able to download a security sensitive application, such as a banking or payment application and initiate installation of the application on the mobile device. Furthermore, through a user interface provided by the mobile device, the user may be capable of selecting a secure installation option for installation of the security sensitive application.

A "trusted execution environment" (TEE) may be a secure environment on the computing device for securely executing an application. A trusted execution environment may be supported in software, hardware, firmware or a combination thereof. The trusted execution environment may be implemented so that its execution and data space are isolated from other environments executing code on the computing device. For example, the trusted execution environment may have dedicated or protected processing and system resources, such as secure storage and protected memory buffers. In some implementations, a trusted execution environment may have paging structures, exception handlers, protected memory regions and hardware resources dedicated or associated with the trusted execution environment. A trusted execution environment is not limited to but may be implemented using one or more trusted execution environments that may include a secure element, SIM/UICC card, or virtualization technology.

A "cryptographic measurement" may be generated from a sequence of bits, such as a message or software using well-known one way hash functions, resulting in a cryptographic string. Examples of such cryptographic functions include, but are not limited to SHA-1 (Secure Hash Algorithm-1) and SHA-256 (Secure Hash Algorithm-256). A cryptographic measurement uniquely identifies the sequence of bits using the cryptographic string so that no other cryptographic string may represent the same sequence of bits. The cryptographic measurement of a sequence of bits may be used to authenticate the integrity of the sequence of bits (i.e., the sequence of bits have not been tampered with). For example, a cryptographic measurement of an operating system may be checked against a stored value from a protected location to determine that the operating system has not been modified from its expected state.

A "digital fingerprint" is a value or string representing a summary of the state of the software and hardware components in a device. A digital fingerprint can be generated based on information collected about the individual components in a device, such as attestation values associated with the components.

An "attestation value" is a value or string representing the state of a software or hardware component. An attestation value can be used to indicate the presence, identity, and integrity of a component installed or available on a device.

"Authentication" or "authenticating" may be the process of proving or verifying certain information, and/or verifying the identity of the source of that information. Authentication to verify the source of information can be achieved, for example, through the use of digital certificates and/or digital signatures. The digital certificate and/or digital signature can be generated using a private key of a key pair, and can be verified using a public key of the key pair.

"Integrity" may be an indication of the absence of corruption in a software or hardware component. Integrity can be used to indicate that a component can be trusted, is unaltered, and has not been modified by an unauthorized party. Integrity of a component can be determined, for example, by generating a cryptographic measurement of the component, and verifying the cryptographic measurement against a trusted or known good value.

An "operating system" (OS) may be a collection of software that manages computer hardware resources and provides common services for applications. The operating system is a vital component of the system software in a computer system. Applications usually require an operating system to function.

A "network stack" may be an implementation of a networking protocol used for communicating between any two devices. In some implementations, the operating system implements one or more network stacks for communicating with a network, wherein the network comprises of one or more computing devices. An example of a networking protocol is the open standards interface (OSI) networking protocol. A network stack may be capable of communicating over a variety of wired and wireless protocols, such as Ethernet, 3GPP, 3GPP2, CDMA, LTE, Bluetooth, NFC, etc.

A "security sensitive application" may include any application executing on a device that manages or uses sensitive data associated with the user, such as a payment account. Sensitive data may include sensitive information, such as Personal Account Information (PAI) and Personal Identifying Information (PII). Examples of PAI data may include account numbers, such as Personal Account Numbers (PAN) associated with a payment device, a Personal Identification Number (PIN), etc. Example of PII data may include social security number, name, birth date, mother's maiden name, an answer to a security question (e.g., name of first pet) etc.

A "secure communication channel" may be a networking channel between two entities, such as a server computer and mobile device, that may allow the two entities to communicate with each other through a secure channel without eves dropping by a third entity, spoofing of the communication by a third entity or masquerading of the third entity as one of the two expected entities participating in the secure communication. Setting up a secure communication channel allows sensitive information such as credit card numbers, social security numbers, login credentials and signaling information for managing the trusted execution environment to be transmitted securely between the two entities. Known techniques, such as secure socket layer (SSL) protocols may be used in establishing a secure communication channel.

A "secure element" is an example of a trusted execution environment. A secure element securely store applications and/or credentials (e.g., financial account numbers) and provide for secure execution of applications. The secure element may comprise secure memory and execution environment that is a dynamic environment to securely store application code and data and administer the secure execution of applications. The secure element may comprise computing logic, such as a 8-32 bit CISC/RISC processor, a crypto processor for encrypting, decrypting and signing data packets using security algorithms such as AES, DES, ECC, a random number generator, ROM, RAM, EEPROM/Flash, a communication interface and a Memory Management unit. The secure element may also provide delimited memory for each application.

"Virtualization" may be used for providing isolation between different operating environments sharing the same physical resources. In other words, virtualization provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM.

A "subscriber identity/identification module" (SIM) is an example of a trusted execution environment. The SIM is commonly used to securely store the international mobile subscriber identity (IMSI) and the related key used to identify and authenticate subscribers on mobile devices. A SIM circuit is embedded into a removable plastic card. This plastic card is called "SIM card" and can be transferred between different mobile devices. A SIM card is an example of a trusted execution environment, however, other variations of a SIM card, such as a universal integrate circuit card (UICC) may be interchangeably used herein, without departing from the scope of the invention.

"Root of trust" (RoT) can be a combination of one or more of hardware, firmware, and/or software components for performing security-critical functions, such as measuring/verifying software, protecting cryptographic keys and performing device authentication. The root of trust is ideally implemented in hardware or protected by hardware and is inherently trusted. The root of trust may also present an immutable uniqueness or identity for the computing device via a hash of a public key associated with a trusted entity, embedded in secure fuses and accessible by the processor in a secure manner. In exemplary implementations, option ROMs or secure fuses may be used for implementing a root of trust on a device.

An "application package" may include a security sensitive application and a verification agent that can facilitate the secure installation of a security sensitive application on the mobile device. The application package may be downloaded by a user on the mobile device. The application package may also include a Virtual Machine Monitor (VMM) installer. The verification agent can be used to verify the security sensitive application and the mobile device, and can be used with the VMM installer to securely install the security sensitive application from the application package onto the mobile device.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. In some implementations, the payment processing network may interact with applications running on a user device. The payment processing network may include a server computer. The payment processing network may use any suitable wired or wireless network, including the Internet.

As used herein, an "issuer" may typically refer to a business entity (e.g., a bank) that maintains financial accounts for the user and often issues a payment device, such as a credit or debit card to the user. An "issuer" may also refer to a trusted authority that provides digital certificates used for authentication. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchants and issuers may comprise one or more computer apparatuses to enable communications through the communications network, or to perform one or more of the functions described herein.

A "mobile operating network" may be a radio network distributed over land areas called cells, each served by at least one fixed-location transceiver, known as a cell site or base station. When joined together these cells may provide radio coverage over a wide geographic area. This enables a large number of mobile devices to communicate with each other and with fixed devices anywhere in the network, via base stations.

As used herein, "enrollment" may be the process of registering a mobile device for a service such that the service can be accessed from the mobile device. In some instances, a user may have an existing account with a service provider, but may not be able to access the service from the user's mobile device unless the mobile device is enrolled with the service provider. For example, if a mobile device is not enrolled for a service, the service provider may block access to the service from the mobile device because the mobile device is not recognized by the service provider.

FIG. 1 illustrates an exemplary system 100 with at least some of the entities in communication with a mobile device 102 in accordance with some embodiments of the present invention. A user of mobile device 102 can download applications and installs those applications on mobile device 102. The user of mobile device 102 may communicate with one or more entities in the process of downloading, installing, or using applications.

The user may communicate with mobile network operator 110 through a cellular network 104 using well-known wireless communication protocols, such as CDMA, GSM, 3GPP, 3GPP2, LTE or any other suitable communication protocol. A cellular network 104 may comprise of one or more base stations (not shown) and communication routing centers (not shown) for communicating between mobile device 102 and mobile network operator 110. In one implementation, for data communication, mobile network operator 110 may route the communication to an IP network 108. For example, a mobile device user may be able to access internet service, such as accessing certain webpages or interacting with servers via mobile network operator 110 through the use an installed application on mobile device 102.

Mobile device 102 may also directly access IP network 108. For example, the user may connect to IP Network 108 through a WiFi (802.11) connection. Once mobile device 102 is connected to IP Network 108, mobile device 102 may connect and communicate with one or more entities. For example, the user may connect with mobile network operator 110 using mobile device 102 to manage voice and data usage. In the regular course of usage, mobile device 102 may interact with many entities for managing accounts, making payments, or a variety of other tasks that may involve accessing, updating and transmitting user sensitive information. For example, the user may make a payment at a point of sale terminal or online with a merchant 126, and in the process, share credit card information with merchant 126. The user may manage their online credit card accounts with credit card issuer 124 or may connect to a payment processing network 122 to manage and authorize transactions. The user may also connect to a financial institution 120, through mobile device 102, for managing bank accounts, credit card accounts, mortgage accounts, or other financial accounts.

In accessing some of the services mentioned herein, the user may download and install applications that connects with one or more entities to access, update, store, or transmit user sensitive information. The user may download applications from financial institution 120 or service provider 116, etc. directly, find the applications on an online application store 112, such as the Apple® or Google® application stores, or download the application from a third party vendor or an internet website.

Some applications, such as games, calculators, or other tools do not directly interface with user sensitive information, and running such applications on a compromised device or downloading a corrupted or hacked version of the application may not expose additional user sensitive data. However, many of the applications discussed above may directly interface with user sensitive information, and exposing such information through a compromised mobile device 102 or a hacked version of the application may be detrimental to the user's interests.

Figure 2:
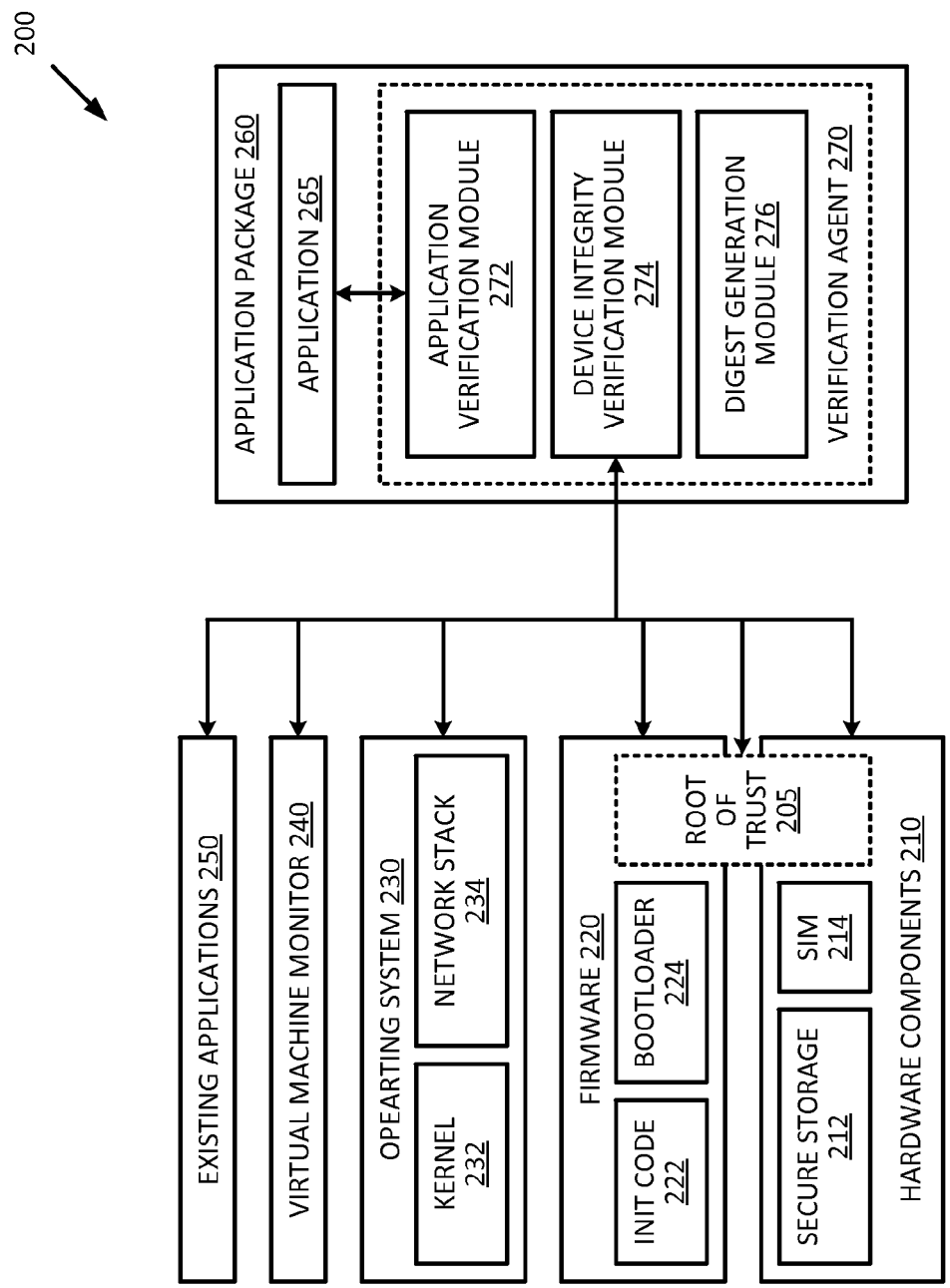
FIG. 2 illustrates at least some of the elements of an exemplary mobile device according to some embodiments of the invention.

FIG. 2 illustrates a conceptual block diagram of at least some components of a mobile device 200 that can participate in an exemplary secure device enrollment process in accordance with some embodiments. It should be understood that a mobile device does not need to include all the components shown in FIG. 2, and that a mobile device can include additional components not shown.

Mobile device 200 may include hardware components 210 that are used to implement at least some of the security features of mobile device 200. For example, hardware components 210 may include a secure storage 212 for storing sensitive information and security sensitive applications. The sensitive information stored in secure storage 212 may include sensitive data such as cryptographic keys, security parameters, Personal Account Information (PAI), and/or Personal Identifying Information (PII). Secure storage 212 may provide a limited access interface that prohibits access to the storage area except for trusted applications and trusted entities. In some embodiments, secure storage 212 can be implemented as a memory chip (e.g., an integrated memory chip in mobile device 200, or in a user removable memory card), as part of a secure element, as part of a SIM, or any combinations thereof.

Subscriber identity module (SIM) card 214 is a user removable component that securely stores an international mobile subscriber identity (IMSI) and the related cryptographic keys used to identify and authenticate a subscriber or user of mobile device 200. SIM 214 can additionally store other sensitive data and security sensitive applications, and provide a trusted execution environment for the security sensitive applications to execute from. SIM 214 can also be used as secure storage 212 or supplement secure storage 212.

Firmware 220 is a set of protected code that interacts closely with hardware components and is executed during startup of mobile device 200. Firmware 220 may include initialization code 222 that is used to initialize and setup the hardware configuration of mobile device 200, and a boot loader 224 that is used to load operating system 230 during startup. After startup, firmware 220 may provide an interface through which operating system 220 can manage and control hardware components of mobile device 200. Firmware 220 can be stored in a read-only or write-protected memory, and is updated infrequently or not at all during the lifetime of mobile device 200.

Roots of Trust (RoT) 205 is a set of trusted security functions for performing security-critical functions, such as measuring/verifying software and hardware configuration, protecting cryptographic keys and performing device authentication. RoT can be implemented with hardware components 210 and/or firmware 220. In some embodiments, RoT 205 can additionally be implemented with software components residing outside firmware 220. In some embodiments, RoT 205 can include a set of attestation registers that is used to store attestation values indicative of the presence and integrity of the various components (e.g., hardware, firmware, operating system, etc.) of mobile device 200. RoT may periodically monitor the state of the various components of mobile device 200 and update the attestation registers accordingly. In some embodiments, only RoT 205 can modify the contents of the attestation registers.

The operating system 230 can include kernel 232 and network stack 234. Kernel 230 provides an interface between software applications running on mobile device and system resources. For example, kernel 230 can process requests from applications and translates them into system calls to interact with system components of mobile device 200. Network stack 234 provides operating system 230 and applications with an interface to communicating with external devices, such as one or more of the entities shown in FIG. 1, over a network. Network stack 234 also provides secure communication channels to allow mobile device to communicate securely with an external device or entity.

Operating system 230 can also implement and enforce a set of security policies that manages and limits which components (e.g., software applications, hardware, stored data, etc.) of mobile device 200 can interact with each other, and how the components interact with each other. For example, the security policies may define access controls such as read, write, and/or execute permissions to prevent certain components (e.g., applications) from accessing certain types of sensitive data, or from executing certain types of function calls. The security policies can also define what types of protocol (e.g., authentication) is necessary to gain permission for a particular access. For example, a security sensitive application may be allowed to read certain types of sensitive data, but additional authentication in the form of a PIN entry from a user may be required for the application to modify or overwrite sensitive data. The security policies can alternatively or additionally be implemented in and/or enforced by hardware, firmware, and/or other software components.

In some embodiments, mobile device 200 may include a virtual machine monitor (VMM) 240. The presence of VMM 240 indicates that mobile device 200 is capable of performing virtualization to create isolated execution environments in which applications can execute from. For example, VMM 240 can enable mobile device to create a secure container (i.e. a trusted execution environment) in a virtual machine for the installation and execution of a security sensitive application. In some embodiments, a secure container can also be used to contain an untrusted application such that the untrusted application is isolated from the other components of mobile device 200.

Existing applications 250 are applications that are installed on mobile device 200. Such applications can include email applications, text or instant messaging applications, internet browsers, games, productivity applications, mapping applications, and/or any application that is preloaded on mobile device 200 or downloaded from an application store. Existing applications 250 can also include applications used to access subscription-based content such as media data (e.g., videos, music, etc.), and security sensitive applications such as mobile banking applications, mobile payment applications, etc.

Application package 260 is a software package that is downloaded from an application store or from an entity that provides applications for mobile devices (e.g., a service provider, a financial institute in case of mobile banking or mobile payment applications, a software developer, a merchant, etc.). Application package 260 can be temporarily stored in a memory region of mobile device during the device enrollment process. Application package 260 includes an application 265 that has yet to be installed on mobile device 200. In some embodiments, application 265 can be in the form of a software image. Application 265 is a software application associated with a service provider, which when executed, allows a consumer or user to access a service provided by the service provider via mobile device 200. Example of services that application 265 can provide access to may include mobile banking, mobile payment, media content, internet shopping, communication (e.g., corporate or personal email, text or instant messaging, voice calls, etc.), network access, or other suitable services from service providers that can be accessed via a mobile device. In some embodiments, such as mobile banking and mobile payment, application 265 may be a security sensitive application that manages or uses Personal Account Information (PAI) and/or Personal Identifying Information (PII). Before application 265 can be used to access the particular service associated with application 265 via mobile device 200, enrollment of mobile device 200 with the service provider may be required.

In some embodiments, the downloaded application package 260 may also include a verification agent 270 as shown. In other embodiments, verification agent 270 is resident on mobile device 200 as software and/or firmware, and is not downloaded. Verification agent 270 can be executed from inside a secure or trusted execution environment, such as a secure element. Verification agent 270 prevents application 265 from being installed on mobile device 200 until verification agent 270 has determined that application 265 can be trusted and that mobile device 200 is in a trusted state.

Verification agent 270 includes application verification module 272 used to verify the authenticity of application 265 to ensure application 265 originated from a trusted source, and to verify the integrity of application 265 to ensure that application 265 has not been hacked (i.e. has not been corrupted, altered, or modified). Verification agent 270 also includes device integrity verification module 274 used to verify the integrity of mobile device 200 to ensure the mobile device is in a trusted state. Device integrity verification module 274 can interact with one or more components of mobile device (e.g., hardware components 210, firmware 220, RoT 205, operating system 230, VMM 240, existing applications 250, etc.) to determine if the mobile device is in a trusted state. For example, device integrity verification module 274 can be used to verify that operating system 230 has not been jail-broken, that existing applications 250 do not include any untrusted software, malware or viruses, and/or that hardware components 210 and firmware 220 have the requisite security capabilities in place to safeguard execution of application 265 and the sensitive data that may be managed or used by application 265. Verification agent 270 also includes a message digest generation module 276 used to generate an enrollment message digest associating application 265, mobile device 200, and user identifying information of the user of mobile device 200. The enrollment message digest is transmitted to a trusted entity or a service provider associated with application 265 (e.g., a financial institution, a merchant, a content owner, etc.) to enroll mobile device 200 for access to the service provided by the service provider.

In some embodiments, application package 260 may include a smart manifest of application 265. The smart manifest may include information about application 265 such as the name of application 265, a description of application 265, and an application mode indicating the execution environment of application 265 (e.g., indicating that application 265 is a security sensitive application to be executed in a trusted execution environment). This information can be used by mobile device 200 and/or verification agent 270 to facilitate verification of the mobile device's integrity to ensure the proper security capabilities are available on mobile device 200.

In some embodiments, application package 260 can be downloaded without a verification agent if a compatible verification agent is already resident on mobile device 200 (e.g., preloaded or has previously been downloaded on mobile device 200). Verification agent 270 can also be downloaded separately from application 265. Verification agent 270 can be application specific; that is, verification agent 270 can be designed to verify application 265 only. In some embodiments, verification agent 270 can be service provider or application vendor specific, and is designed to verify applications from a particular service provider or application vendor. Verification agent 270 can also be designed to verify applications from multiple service providers and/or application vendors. Verification agent 270 can also be designed to be used with a particular type of mobile device and/or operating system, a particular mobile device manufacturer, a particular mobile network operator, or can be designed to be compatible with multiples of any of the above.

Having described the various components of a mobile device that may participate in the enrollment process, embodiments of the secure device enrollment process will now be described with reference to FIGS. 3-5.

Exemplary Secure Device Enrollment

Figure 3:
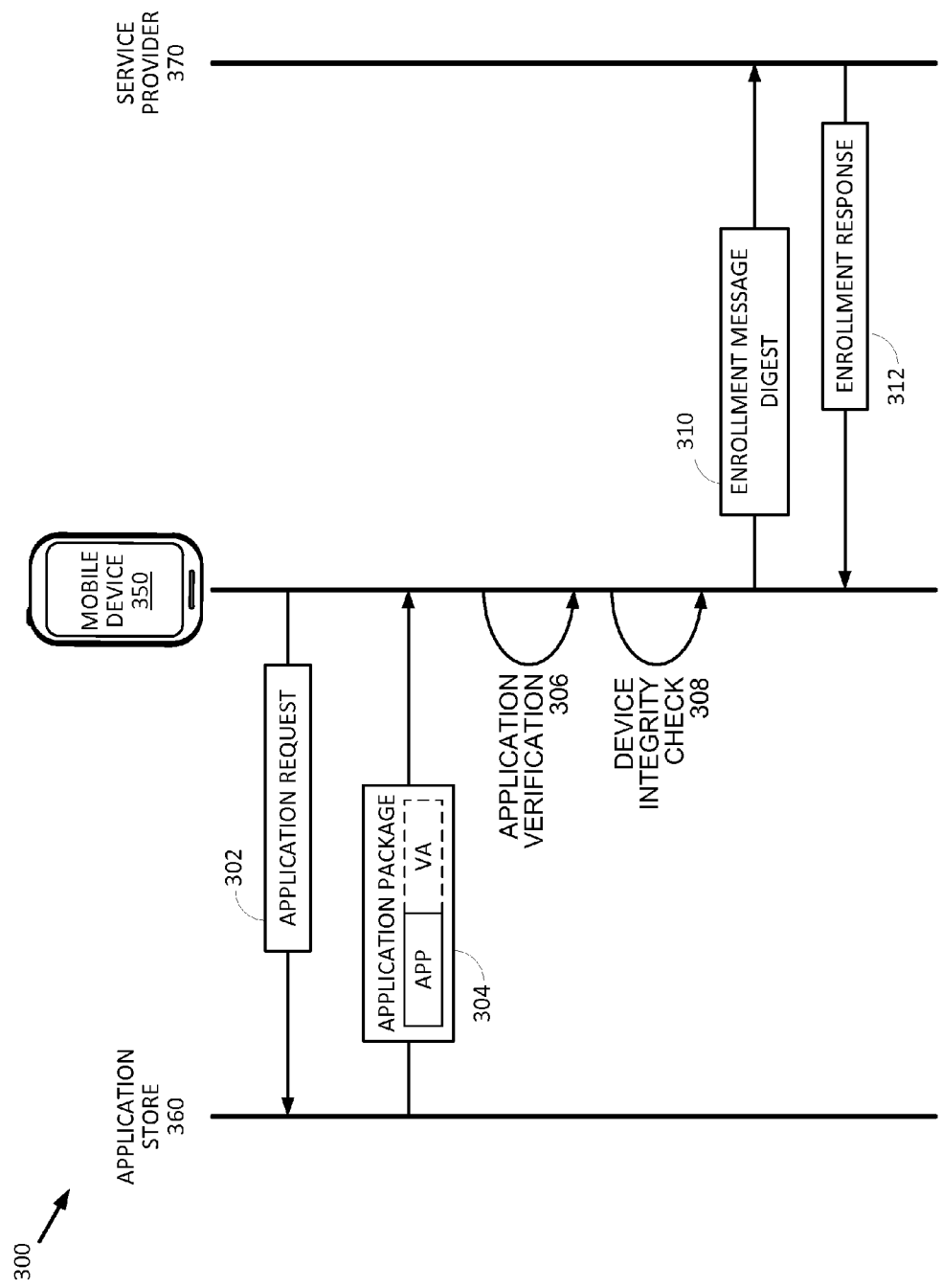
FIG. 3 illustrates an exemplary communication flow in a device enrollment process according to some embodiments of the invention.

FIG. 3 illustrates an exemplary communication flow 300 of a secure device enrollment process in accordance with some embodiments. To download an application that can be used to access to a service via mobile device 350, a user operates mobile device 350 to send an application request 302 to application store 360 to request the application. In some embodiments, application request 302 may include a verification agent indicator that indicates whether mobile device 350 has a preloaded or previously downloaded verification agent. The verification agent indicator may also include a verification agent identifier to identify the particular verification agent available on mobile device 350 such that application store 360 can make a determination as to whether the verification agent available on mobile device 350 is compatible with the requested application. The verification agent identifier can be in the form of a digital certificate, and/or other identifying information such as one or more of a serial number, an issuer of the verification agent (e.g., a service provider), a version number, etc. In some embodiments, the verification agent indicator can be transmitted to application store 360 separately from application request 302, and can be transmitted in response to a request for a verification agent indicator from application store 360.

According to some embodiments, mobile device 350 itself can make the determination as to whether the verification agent available on mobile device 350 is compatible with the requested application. For example, if the verification agent is service provider specific and the requested application is from the particular service provider associated with the verification agent, mobile device 350 can determine that the available verification agent in mobile device 350 is compatible with the requested application. In this scenario, mobile device 3590 can send a verification agent indicator indicating not only that mobile device 350 already has a verification agent available, but also that the verification agent is compatible with the requested application.

In response to application request 302, application store 360 sends an application package 304 that includes at least the requested application to mobile device 350. If a compatible verification agent is not already available on mobile device 350, application package 304 may include a compatible verification agent. Alternatively, a compatible verification agent can be downloaded separately from the request application, and can be downloaded from another source such as a trusted entity or a service provider (e.g., a financial institute, etc.). According to some embodiments, instead of download application package 360 from application store 360, application package 360 can be downloaded directly from a service provider (e.g., a financial institute, etc.), a software developer, or some other application vendor that provides applications for mobile devices.

In some embodiments, prior to executing the verification agent, the verification agent may be verified and authenticated by components of mobile device 350. For example, secure processing logic, such as a secure element or a Root of Trust, may authenticate the verification agent through the use of digital certificates and digital signatures. The authentication and verification of the verification agent may be facilitated by using additional hardware hooks on mobile device 350, such as encryption/decryption keys. The hardware of mobile device 350 may generate random or pseudo-random numbers for facilitating cryptographic operations to verify the verification agent. For example, the hardware of mobile device 350 may request the verification agent to encrypt/decrypt a random number using a key than is known only to authentic verification agents.

Upon receiving application package 304 and optionally authenticating the verification agent, the verification agent can be executed to verify the received application. In some embodiments in which the mobile device 350 already has a preloaded or previously downloaded verification agent, the verification agent may already be running when application packages 304 is received. The verification agent may continuously be run on mobile device 350 to monitor for new downloads of applications. The verification agent prevents the received application from being installed on mobile device 350 until the authenticity of the application and the integrity of the application and the mobile device can be determined. Application verification 306 performed by the verification agent can include an application authentication that verifies the signature and certificate information of a digital certificate attached to the received application to identify the source of the application. Application verification 306 can also include an application integrity verification of the received application, for example, by generating a cryptographic measurement (e.g., a hash) of the received application. The cryptographic measurement can be compared with a trusted or known good value stored in or obtained by the verification agent (e.g., from a trusted source) to verify that the application received by mobile device 350 is unaltered and has not been hacked, corrupted, or otherwise modified by an unauthorized party. In some embodiments, the trusted or known good value can be provided in the digital certificate of the received application.

If the received application cannot be authenticated (e.g., invalid signature, or incorrect certificate information), the received application may have originated from an unknown or untrusted source. If the cryptographic measurement of the received application does not match the trusted or known good value, the received application may have been corrupted or otherwise modified. This may happen inadvertently by transmission errors during the transmission of the application, or maliciously by unauthorized parties injecting malware or a virus in the application. In either scenarios, mobile device 350 may display a message to the user indicating that the received application may pose a security risk. In some embodiments, the process terminates and the received application cannot be installed in mobile device 350. In other embodiments, the user may be prompted to select between terminating the process, re-downloading application package 304, or to proceed further with the process using the received application given the known security risk.

In addition to verifying the received application, the verification agent also verifies the integrity of mobile device 350 by performing a device integrity check 308. Device integrity check 308 can be performed before, concurrently with, or after application verification 306. In embodiments in which mobile device 350 has a preloaded or previously downloaded verification agent, device integrity check 308 can also be performed before application package 304 is received.

Device integrity check 308 verifies the integrity of various components of mobile device 350 and provides an overall integrity of mobile device 350. It should be understood that not all components described herein needs to be verified. In other words, in some embodiments, only the integrity of a subset of the components in mobile device 350 are verified. In some embodiments, the determination as to which components should be verified can be based on what type of application is being downloaded. Depending on the security requirements of an application (e.g., if the application requires access to sensitive data), device integrity check 308 may verify different sets of components for different applications. In some embodiments, a standard set of components across different applications can also be defined.

In some embodiments, device integrity check 308 may involve reading a set of attestation values from attestation registers maintained by the Root of Trust of mobile device 350 if such is available. Each attestation register may correspond to a component of mobile device 350 (e.g., any one of hardware components, firmware components, operating system components, virtual machine monitor, existing applications, etc.). In some embodiments, each attestation register can correspond to a group of components. The attestation value can be used to detect and identify modification of an asset (e.g., application or data) in a collection (e.g., stored or implemented in a component), insertion of foreign assets into the collection, deletion of an asset from the collection and unauthorized sources of collection of data in the collection.

The Root of Trust may periodically perform an integrity check of the various components and update the attestation registers accordingly. For example, the Root of Trust may perform the integrity check each time mobile device 350 is turned on, each time a new application is installed, each time sensitive data is added or modified in mobile device 350, each time an application is downloaded, or at scheduled intervals such as each day, week, month, etc., or at the request of the verification agent.

For firmware components and software components such as the operating system, virtual machine monitor, and/or existing applications and firmware components, the integrity of these components can be determined by using digital certificates and signatures (if available) associated with these components using the techniques described herein. The verification agent may also generate cryptographic measurements of the respective code images of these components and/or of the digital certificates. The cryptographic measurements can be stored in the respective attestation registers as attestation values to indicate the integrity of these components. The version and build number of these components can also be included.

For hardware components, the integrity of these components can be verified by serial numbers, issuer/manufacturer identification numbers, or other hardware component identifier or unique numbers stored or implemented in the hardware components. The verification agent may request the hardware components to perform cryptographic operations using cryptographic keys only available to genuine hardware components. This can provide an indication of the security capabilities of the respective hardware components (e.g., ability to perform certain types of cryptographic operations, etc.). In some embodiments, the cryptographic operations can be performed on the hardware component identifier or unique number of the respective components. The result of the cryptographic operations can be stored in the corresponding attestation register to indicate the integrity of the respective hardware components.

The Root of Trust may also determine the set of security policies being enforced in mobile device 350, and generate an attestation value indicating the level of security protection being provided by the components of mobile device 350. The Root of Trust may also perform a trusted execution environment discovery to determine the types of trusted execution environment (e.g., presence of a VMM, secure element, etc.) available on mobile device 350, and generate an attestation value indicating the execution environments available on mobile device 350.

In embodiments in which an attestation register corresponds to a group of components, the value stored in the attestation register can be a hash of the attestation values of the corresponding components in the group.

To determine the integrity of mobile device 350, the verification agent can query the Root of Trust for the set of attestation values corresponding to the components included in device integrity check 308, and compared each attestation value against a known good value, or a set or range of known good values for the corresponding component(s) to determine if mobile device 350 is in a trusted state. As mention earlier, it should be understood that the verification agent does not need to verify the integrity of all components in all scenarios. For example, depending on the particular application being requested, device integrity check 308 may only verify the integrity of a subset of components, and the device integrity check performed for different applications may verify the integrity of different sets of components. The smart manifest of an application can also be used to determine which components are included in device integrity check 308 for a particular downloaded application.

If mobile device 350 does not maintain a set of attestation registers or the attestation registers cannot be accessed, or if a component included in device integrity check 308 does not have a corresponding attestation register, the verification agent may perform its own inquiry as to the integrity of the components of mobile device 350 by generating the attestation values for the various components. The verification agent may generate attestation values for each component included in device integrity check 308 according to techniques similar to those used by the Root of Trust as described above.

In some embodiments, even if mobile device 350 maintains a set of attestation registers, the verification agent may still generate its own set of attestation values and compare the generated attestation values against the attestation values read from the attestation registers. This can provide further assurance that the components of mobile device 350 has not been altered or changed since the last time the Root of Trust has updated the attestation registers.

The set of attestation values either read from attestation registers by the verification agent, generated by the verification agent, or a combination thereof can be used to generate a digital fingerprint of mobile device 350. The digital fingerprint is a representation of the state of mobile device 350. The digital fingerprint can be, for example, a concatenation of the attestation values, a hash of the attestation values, or some other cryptographic measurement of the set of attestation values. In addition or alternative to comparing the individual attestation values against known good values, the determination as to whether the integrity of mobile device 350 is in a trusted state can be performed by comparing the digital fingerprint of mobile divide 350 against a known good value or a set or range of known good values.

If the integrity of mobile device 350 is determined to be in an untrusted or unknown state, mobile device 350 may display a message to the user indicating that the integrity of mobile device 350 may have been compromised. In some embodiments, the process terminates. In other embodiments, the user may be prompted to select between terminating the process or to proceed further with the process given the known security risk.

After the authenticity and integrity of the received application, and the integrity of mobile device 350 have been verified, or if the user has chosen to proceed with the enrollment process despite an unverified application or mobile device, the verification agent generates an enrollment message digest 310 to enroll mobile device 350 for the service associated with the received application. In some embodiments, the verification agent can initiate installation of the received application in mobile device 350 at this time. In other embodiments, the installation of the receive application is not performed until after mobile device 350 has been successfully enrolled for the service.

Enrollment message digest 310 includes an association between the received application, mobile device 350, and user identifying information that can be used to identify the user of mobile device 350. The association can be a string or a value, or a cryptographic binding (e.g., a hash, encryption, etc.) of such a string or value that includes an application identifier, a mobile device identifier, and the user identifying information. In some embodiments, enrollment message digest 310 may also include a digital certificate signed by the verification agent. The digital certificate of enrollment message digest 310 can be used by a recipient to authenticate the enrollment message digest 310.

The application identifier can be, for example, an application ID, a digital certificate of the application, a smart manifest of the application, etc., or any combination thereof. Additionally or alternatively, the cryptographic measurement of the application generated by the verification agent can be used or be included as part of enrollment message digest 310. The application identifier can also include a value derived from any combination of one or more of the above information (e.g., a hash or encryption of any of the above).

The mobile device identifier can be, for example, an immutable unique ID of mobile device 350, a serial number of mobile device 350, etc., or any combination thereof. Additionally or alternatively, the digital fingerprint generated by the verification agent can be used or be included as part of enrollment message digest 310. The mobile device identifier can also include a value derived from any combination of one or more of the above information (e.g., a hash or encryption of any of the above).

The user identifying information can be some unique user information stored on mobile device 350 automatically retrieved by verification agent. Since the user has already logged onto mobile device 350 and has initiated the enrollment process, the user can be presumed to be authenticated. Additional authentication steps (e.g., request a PIN used for unlocking mobile device 350) may be enforced before retrieving the user identifying information from mobile device 350 to verify that the user is the authorized user of mobile device 350. The user identifying information can be, for example, a name or a phone number, that uniquely identifies the user to service provider 370. By using a low value asset such as a name or a phone number that has little value on its own to an unauthorized party, transmission of sensitive data such as Personal Account Number (PAN) or user credentials (e.g., PIN, passwords, etc.) during the enrollment process can be avoided. In some embodiments, other Personal Identifiable Information (for example, birth dates, social security numbers, etc.) can be used in addition or alternative to a name and/or phone number. Although the transmission of sensitive data such as Personal Account Number (PAN) or user credentials (e.g., PIN, passwords, etc.) can be avoided, in some embodiments, such sensitive data can also be used as the user identifying information or be included as part of the user identifying information. The user identifying information can also include a value derived from such user information (e.g., a hash of any of the above), or any combination thereof.

The verification agent may send enrollment message digest 310 to service provider 370 using the mobile device's communication components to enroll mobile device 350 for the service in a secure, seamless, and frictionless manner. Service provider 370 can be a bank, a financial institution, a merchant, a content owner, or other service provider associated with the application. In some embodiments, the device enrollment process described herein can be carried out with a trusted entity associated with service provider 370 instead of directly with service provider 370. In some embodiments, enrollment message digest 310 can be communicated to service provider 370 over a cellular network, for example, via a base station, or be sent using WiFi, WiMax, or any other suitable communication means.

Upon receiving enrollment message digest 310, in embodiments in which a digital certificate is included in enrollment message digest 310, service provider 370 can authenticate the signature of the digital certificate to verify that enrollment message digest 310 was generated by a genuine verification agent. In embodiments in which enrollment message digest 310 includes the cryptographic measurement of the application and/or the digital fingerprint of mobile device 350, service provider 370 can derive these values from enrollment message digest 310. Service provider 370 can verify that the cryptographic measurement indicates the application has not been altered, and/or the digital fingerprint indicates mobile device 350 is in a trusted state before enrolling mobile device 350 for access to the service.

In some embodiments, if enrollment message digest 310 is not authenticated, or if the application or mobile device is not verified, service provider 370 may send a security risk message to mobile device 350. In some embodiments, the process may terminate. In other embodiments, the user may be asked to select between terminating the enrollment process, restarting the enrollment process, or to proceed further with the enrollment process given the known security risk.

Service provider 370 then derives the user identifying information that uniquely identifies the user from enrollment message digest 310. The user identifying information can be used by service provider 370 to verify that the user is an authorized user of the service provided by service provider 370, for example, by looking up account information associated with the user identifying information. If the user is verified to be an authorized user of the service, service provider 370 enrolls mobile device 370 (e.g., using the mobile device identifier derived from enrollment message digest 310) such that the service can be accessed by the user from mobile device 370 via the downloaded application. Service provider 370 then transmits an enrollment response 312 to mobile device 350 indicating the successful enrollment of mobile device 350. In embodiments in which the application is prevented from being installed on mobile device 350 until after mobile device 350 has been successfully enrolled for the service, the verification agent can initiate installation of the application on mobile device 350 in response to receiving enrollment response 312 indicating a successful enrollment. In some embodiments, service provider 370 may also send user credentials or other information to provision the application and/or mobile device 350 for access to the service.

If the user is not an authorized user of the service, service provider 370 may send an enrollment response to mobile device 350 indicating that enrollment of mobile device 350 was unsuccessful, and a message can be displayed on mobile device 350 requesting the user to setup an account with service provider 370 and reattempt the device enrollment process after setting up the account.

Figure 4:
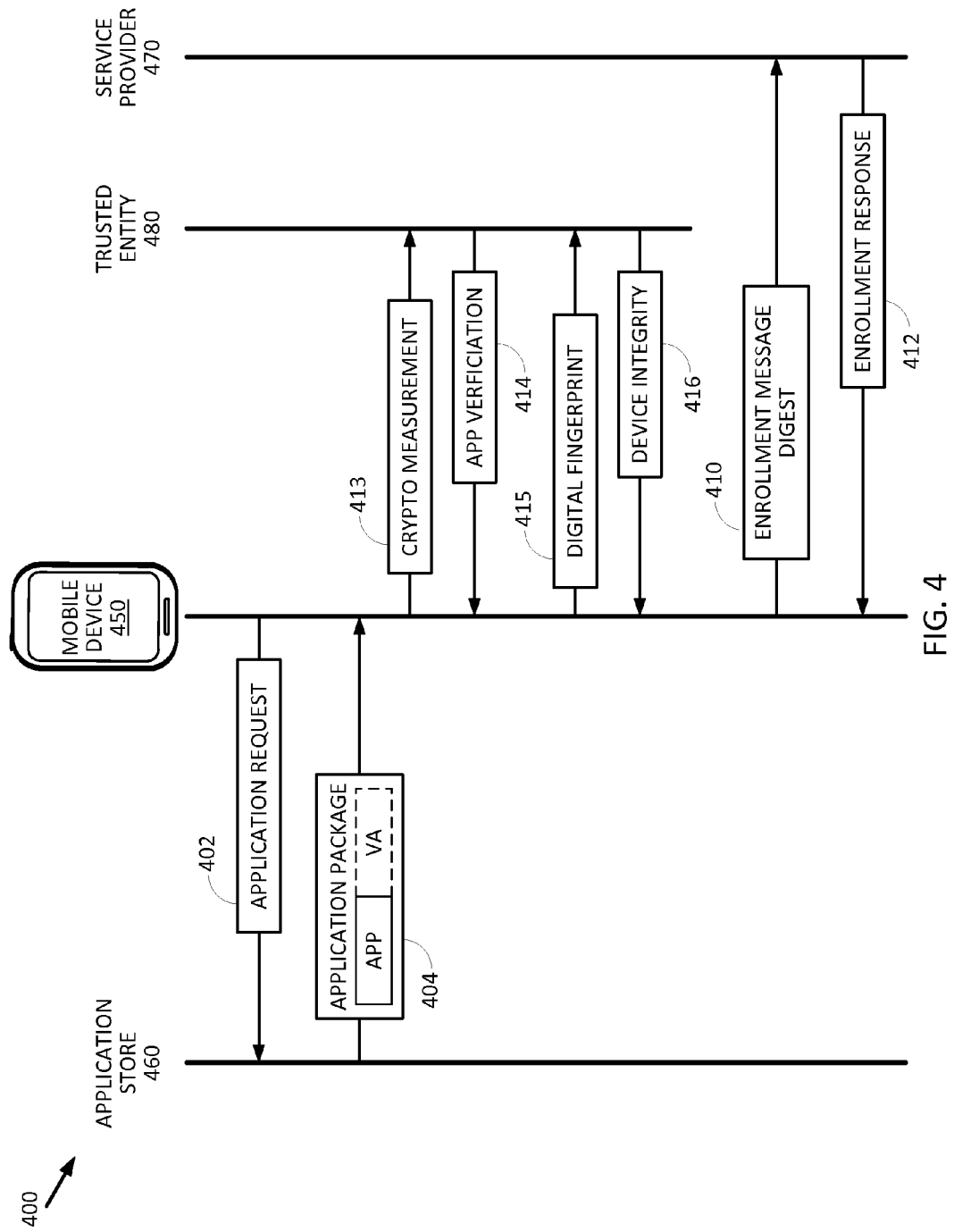
FIG. 4 illustrates another exemplary communication flow in a device enrollment process according to some embodiments of the invention.

FIG. 4 illustrates another exemplary communication flow 400 of a secure device enrollment process in accordance with some embodiments. Entities and communications similar to those discussed above with reference to FIG. 3 are denoted with reference designators having a similar numbering as that of FIG. 3, and the details of which need not be repeated. According to the embodiment shown in FIG. 4, when mobile device 450 receives application package 404 in response to mobile device 450 transmitting application request 402 to application store 460, instead of performing the application verification and device integrity check by the verification agent on its own, the verification agent may interact with a verification server of a trusted entity 480 associated with service provider 470 to perform one or more of these actions. In some embodiments, trusted entity 480 can be service provider 470 itself (e.g., a bank, a financial institution, a merchant, a content owner, or other service provider associated with the application, etc.).

For example, to determine the authenticity of the source of the received application, the verification agent may extract the digital certificate of the application from application package 404, and send the digital certificate (not shown) to the verification server of trusted entity 480 to verify that the received application originated from a trusted source. To determine the integrity of the received application, the verification agent may generated a cryptographic measurement 416 of the received application, and send it to the verification server of trusted entity 480 to verify that the received application has not been corrupted, modified, or altered. The verification server of trusted entity 460 can perform the application verification using the techniques described herein, and send an application verification result 414 indicating whether the received application is authenticate and/or whether the received application is unaltered to the verification agent. The verification agent and mobile device 450 can then take the appropriate actions similar to those describe above with reference to FIG. 3 (e.g., terminate or proceed with the enrollment process, display a message to the user, etc.) based on application verification result 414.

To determine the integrity of mobile device 450, the verification agent may generate a digital fingerprint 415 of mobile device 450 using the techniques described herein, and send it to the verification server of trusted entity 460 to verify that the integrity of mobile device 450 is in a trusted state. The verification server of trusted entity 460 can perform the device integrity check using the techniques described herein, and send a device integrity result 470 indicating the state of mobile device 450 to the verification agent. The verification agent and mobile device 450 can take the appropriate actions similar to those describe above with reference to FIG. 3 (e.g., terminate or proceed with the enrollment process, display a message to the user, etc.) based on device integrity result 416.

In some embodiments in which trusted entity 460 is service provider 470, the subsequent enrollment message digest 410 generated by the verification agent can omit the cryptographic measurement of the received application and the digital fingerprint of mobile device 450 from enrollment message digest 410, because the service provider 470 already has this information. If trusted entity 460 is a separate entity from service provider 470, trusted entity 460 can send the cryptographic measurement and the digital fingerprint to service provider 470 to provide service provider 470 with this information. In some embodiments, enrollment message digest 410 can still include the cryptographic measurement and the digital fingerprint even if service provider 470 already has this information. In these embodiments, service provider can perform an additional verification step to verify that the cryptographic measurement and the digital fingerprint received in enrollment message digest 410 matches the values provided to service provider 470 from the application verification and device integrity check.

A. Exemplary Device Enrollment at Mobile Device

Figure 5A:
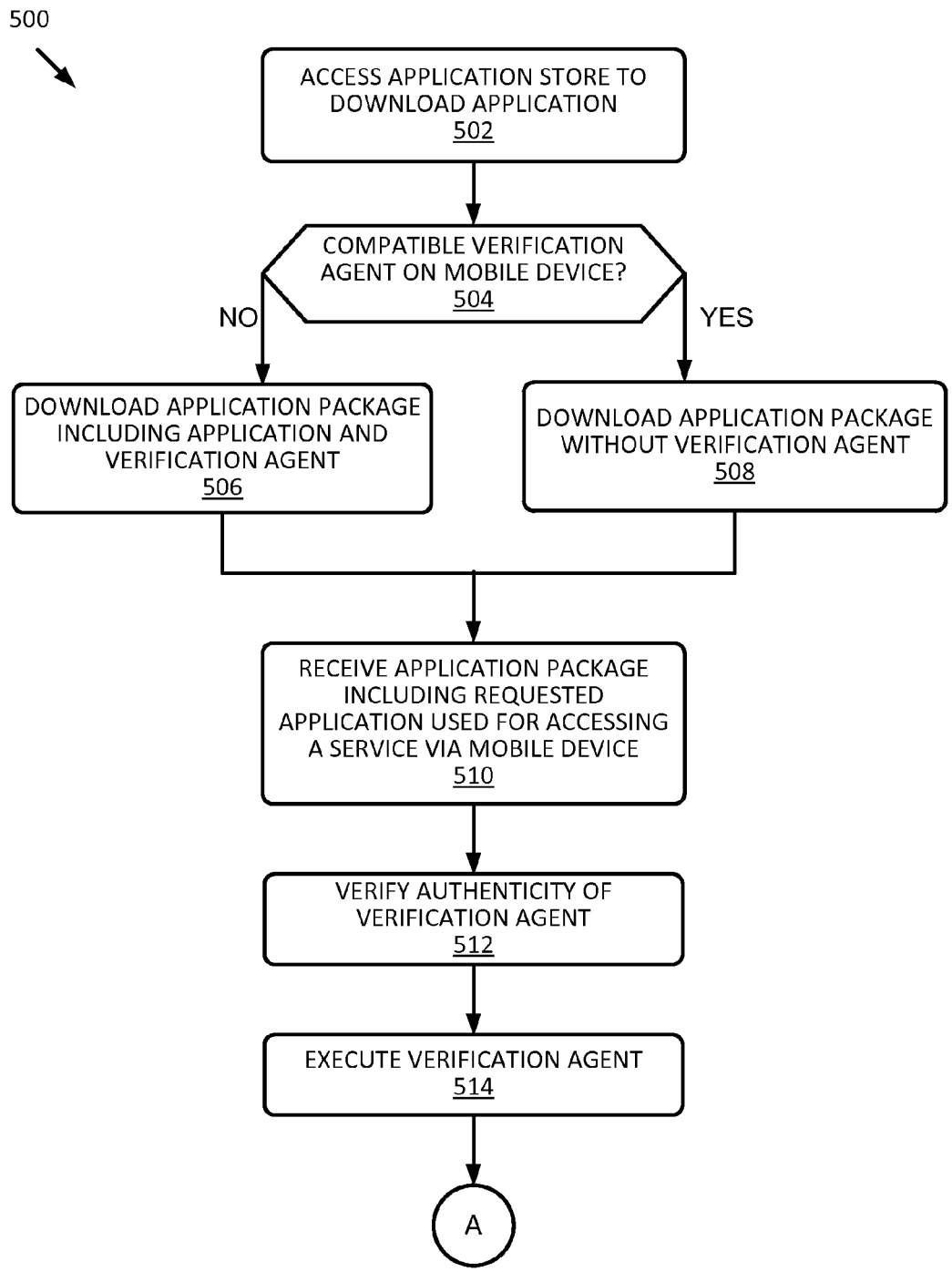
FIGS. 5A-C illustrate an exemplary flow diagram that can be performed by a mobile device for enrolling the mobile device for a service according to some embodiments of the invention.
Figure 5B:
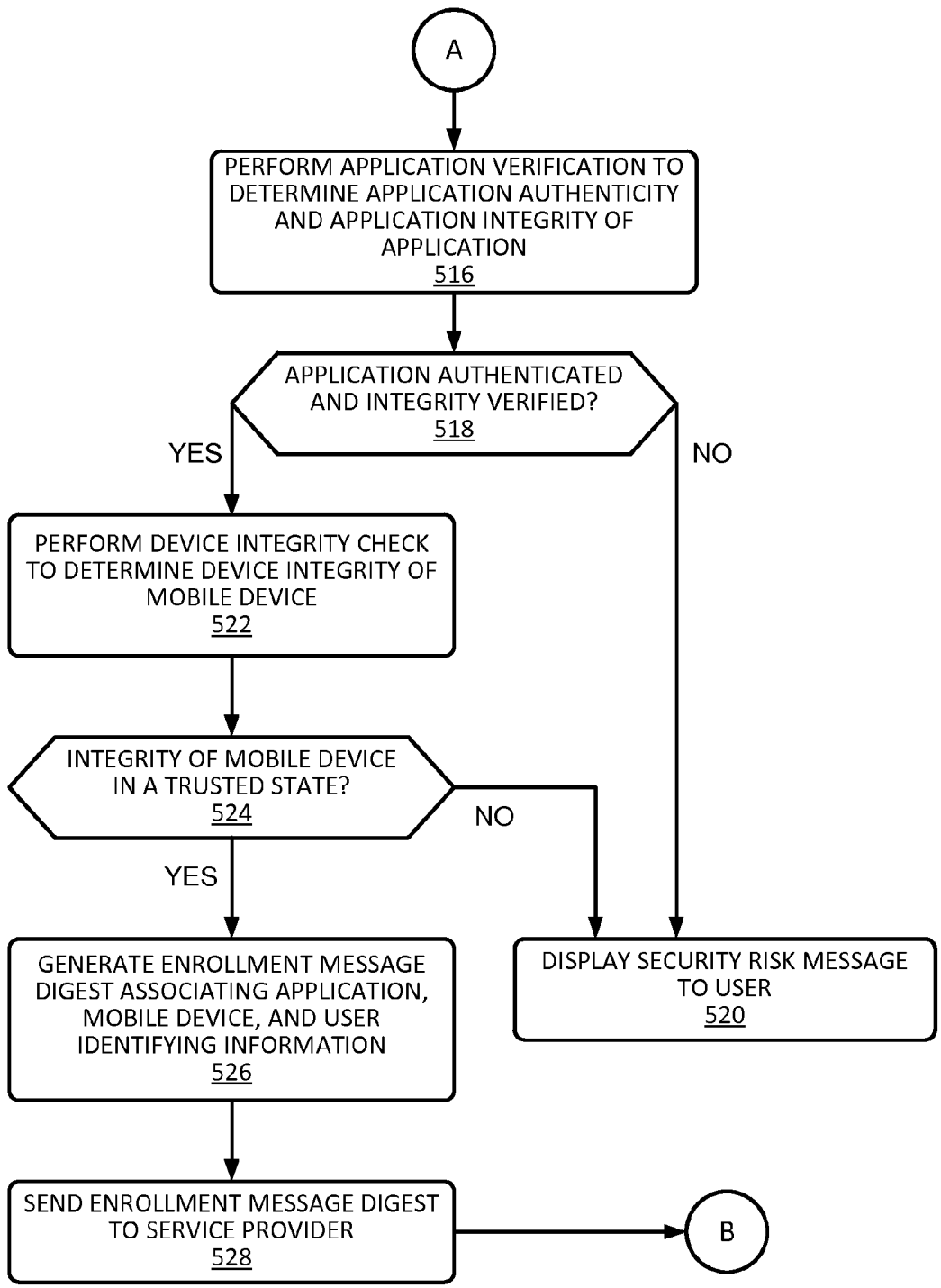
Figure 5C:
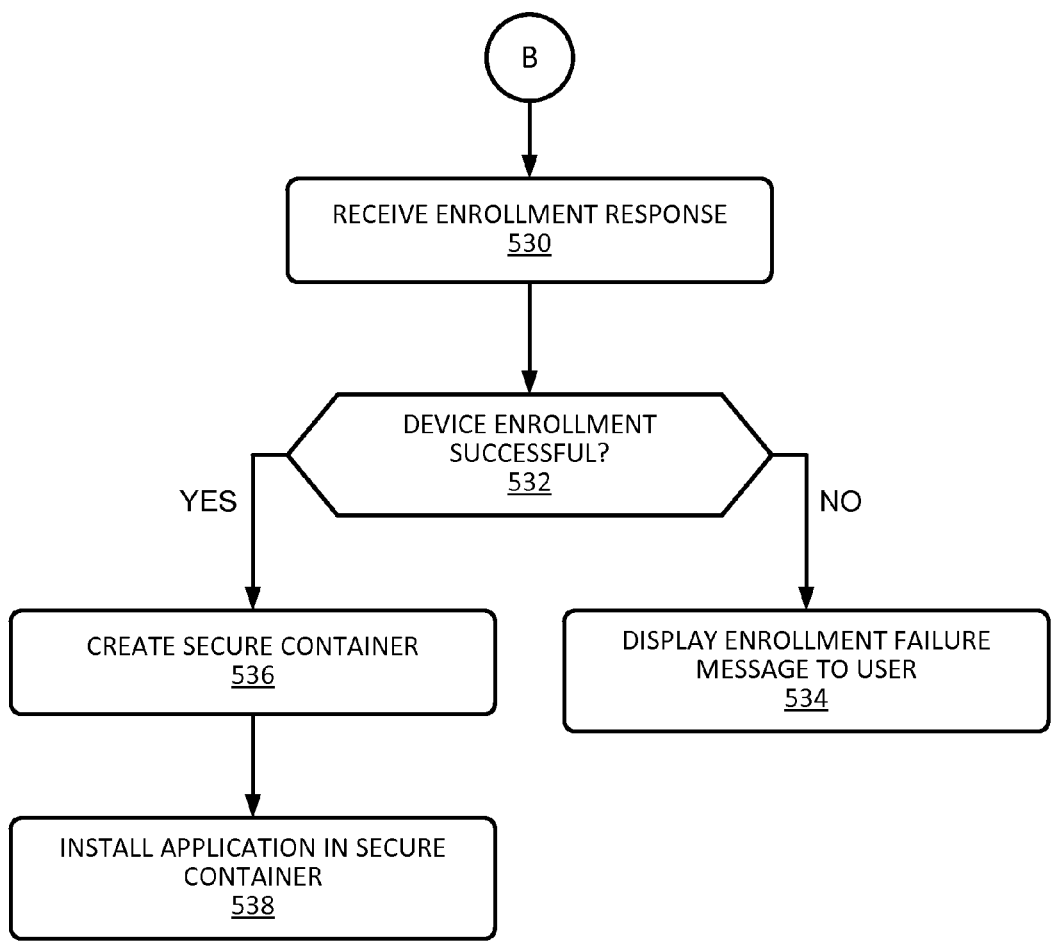

FIGS. 5A-C illustrate a flow diagram 500 of a secure device service enrollment process that can be performed by a mobile device according to some embodiments. Referring to FIG. 5A, at block 502, an application store or an entity that provides applications for mobile devices (e.g., a service provider, a financial institute in case of mobile banking or mobile payment applications, a software developer, etc.) is accessed to request download of an application. At block 504, a determination is made as to whether a compatible verification agent is already available on the mobile device. If the mobile deice already has a compatible verification agent, at block 508, an application package including the requested application is downloaded without a verification agent. If a compatible verification agent is not available on the mobile device, an application package including the requested application and a compatible verification agent is downloaded at block 506. Alternatively, the verification agent can be downloaded separately from the application.

At block 510, an application package including the application used for accessing a service via the mobile device is received. The application package can optionally include a compatible verification agent if one is not already available on the mobile device. In some embodiments, at block 512, the authenticity of the verification agent can be verified using digital signature techniques described herein. After the verification agent is authenticated as originating from a trusted source, at block 514, the verification agent is executed.

Referring now to FIG. 5B, at block 516 the verification agent performs application verification to determine the authenticity and the integrity of the received application. The determination can be made by the verification agent itself, or in conjunction with a trusted entity using the techniques described herein. At block 518, the application verification results are used to verify the authenticity and the integrity of the received application. If the received application is determined to be not authentic (i.e. originated from an untrusted or unknown source), or if the integrity of the application indicates that it has been corrupted, modified, or altered, a message is displayed to the user at block 520 to inform the user that the received application may be a potential security risk. In some embodiments, the user is provided with a choice to proceed further with the enrollment process, re-download the application, or terminate the enrollment process.

If the received application is determined to be authentic (i.e. originated from a trusted source) and the integrity indicates that the application is unaltered, the verification agent performs a device integrity check at block 522 to determine the device integrity of the mobile device. The device integrity can be determined by the verification agent itself, or in conjunction with a trusted entity using the techniques described herein. In some embodiments, the device integrity check can be performed before, after, or concurrently with the application verification. At block 524, the result from the device integrity check are used to determine if the integrity of the mobile device is in a trusted state.

If the device integrity indicates that the mobile device is not in a trusted state (e.g., device has been jail-broken, has unauthorized or untrusted applications installed, lacks proper security capabilities, etc.), a message is displayed to the user at block 520 to inform the user that the mobile device may have been compromised and may pose a potential security risk. In some embodiments, the user is provided with a choice to proceed further with the enrollment process, re-download the application, or terminate the enrollment process.

If the device integrity indicates that the mobile device is in a trusted state, then at block 526, the verification agent generates an enrollment message digest that associates the application, the mobile device, and user identifying information of a user of the mobile device using the techniques describe herein. In some embodiments, the enrollment message digest may include a digital signature signed by the verification agent. At block 528, the enrollment message digest is sent to the service provider to enroll the mobile device for the service.

Referring now to FIG. 5C, after sending the enrollment message digest to the service provider, an enrollment response is received from the service provider at block 530. At block 532, the verification agent determines if the enrollment response indicates the device enrollment was successful or not. If the enrollment response indicates that the enrollment was unsuccessfully (e.g., the user does not have an account with the service provider), then at block 534, an enrollment failure message is displayed to the user. In some embodiments, the enrollment failure message may request the user to setup an account with the service provider.

If the enrollment response indicates that the mobile device was successfully enrolled, the verification agent can initiate installation of the received application. At block 536, a security container can be created for the application (e.g., if the application is a security sensitive application). In some embodiments, the security container can be a virtual machine from which the application executes from. In some embodiments, the security container can be a memory region in a secure element or in a SIM card allocated for execution of the application. At block 538, the application is installed in the secure container. Once the application has been installed and the mobile device automatically enrolled for the service, a user can immediately launch the application and access the service without having to complete a cumbersome and unsecure device enrollment process.

B. Exemplary Application Verification

Figure 6:
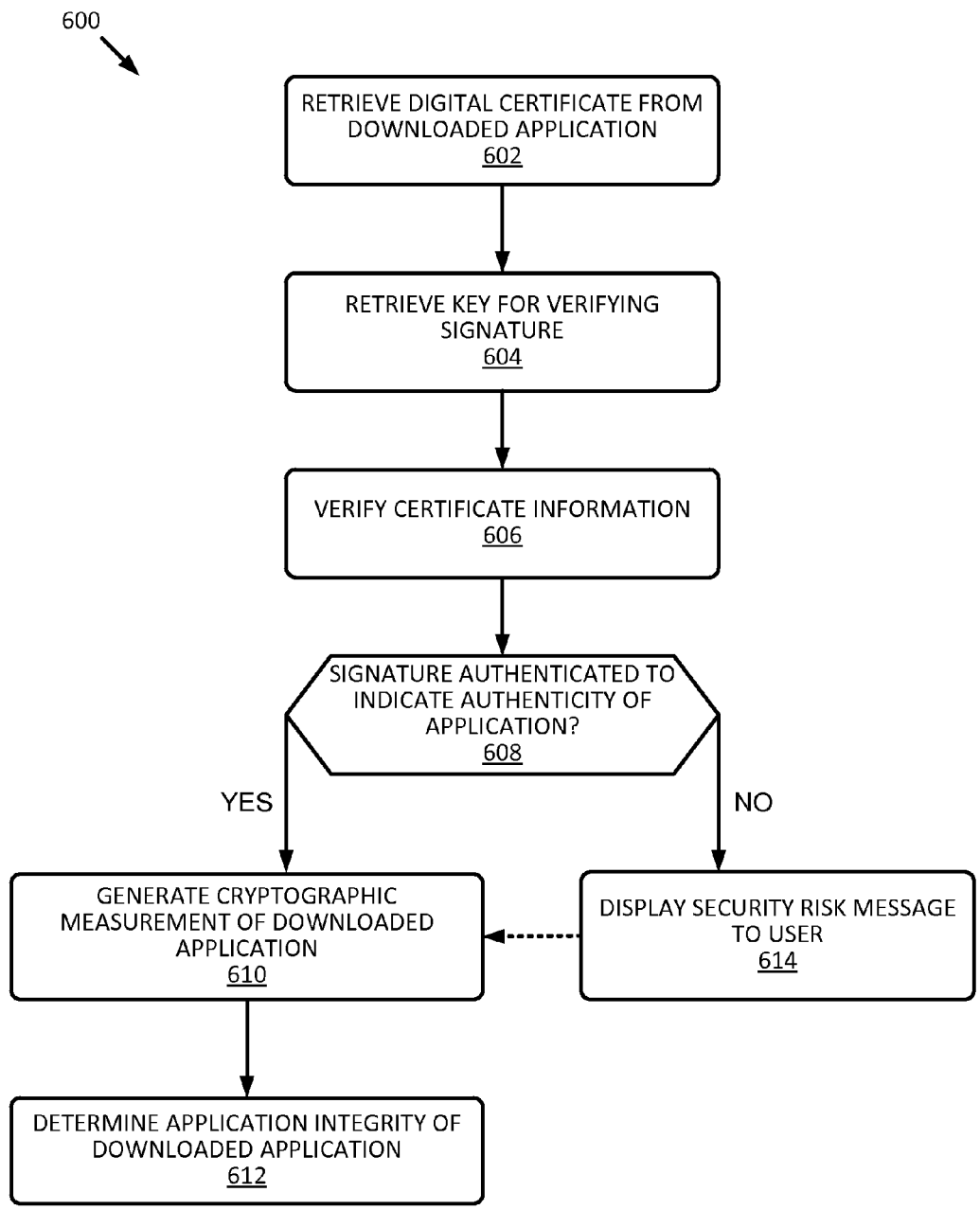
FIG. 6 illustrates an exemplary flow diagram for performing application verification according to some embodiments of the invention.

FIG. 6 illustrates a detailed flow diagram 600 of an application verification process that can be performed by a verification agent in accordance with some embodiments. The application verification is performed after downloading and receiving an application package that includes the requested application. At block 602, the digital certificate attached to the downloaded application is retrieved from the application package. To ensure the authenticity of the application, the digital certificate attached to the application was issued and signed by a certificate authority or a trusted entity who has verified that the application originated from a legitimate and authorized source. The digital certificate may include the digital signature of the certificate authority and additional information such as the identity of the issuer of the digital certificate, a serial number, identification of the cryptographic algorithm used to generate the digital signature, and an expiration date of the digital certificate.

At block 604, the requisite key for verifying the digital signature of the digital certificate is retrieved. In some embodiments, the key can be included as part of the digital certificate, or be included in the verification agent. The verification agent can also obtain the requisite key separately by requesting the key from the issuer of the certificate. At block 606, the verification agent verifies the certificate information to ensure the certificate is valid (e.g., has not expired, issued by a valid authority, etc.), and verifies the digital signature using the retrieved key. At block 608, the verification agent determines if the digital signature of the digital certificate is authentic. In some embodiments, instead of verifying the digital signature by the verification agent on its own, the verification agent may send the retrieved certificate to a trusted entity for verification. The determination as to whether the digital certificate is authentic can be made based on an a digital signature verification response from the trusted entity.

If the digital signature is determined to be authentic, then at block 610, the verification agent generates a cryptographic measurement of the downloaded application. The cryptographic measurement can be, for example, a hash of the application image. At block 612, the verification agent determines the integrity of the downloaded application to verify whether the downloaded application has been corrupted, modified, or altered to ensure that the application does not contain any malicious or unauthorized code injected by an unauthorized party. The verification agent can verify the integrity of the downloaded application by comparing the cryptographic measurement against a trusted or known good value. The trusted or known good value can be included as part of the verification agent, or be obtained from a trusted entity. In some embodiments, the verification agent can send the cryptographic measurement to a trusted entity for verification.

Referring back to block 608, if the digital signature cannot be authenticated, then at block 614, a message is displayed to the user notifying the user that the application may have originated from an unknown or untrusted source and may pose a security risk. In some embodiments, despite an unauthenticated signature, the process continues to block 610 to check the integrity of the downloaded application.

Although the use of digital certificates and digital signatures have been described with reference to authenticating the downloaded application, the same techniques can also be used to authentic other component of the mobile device.

C. Exemplary Device Integrity Check

Figure 7:
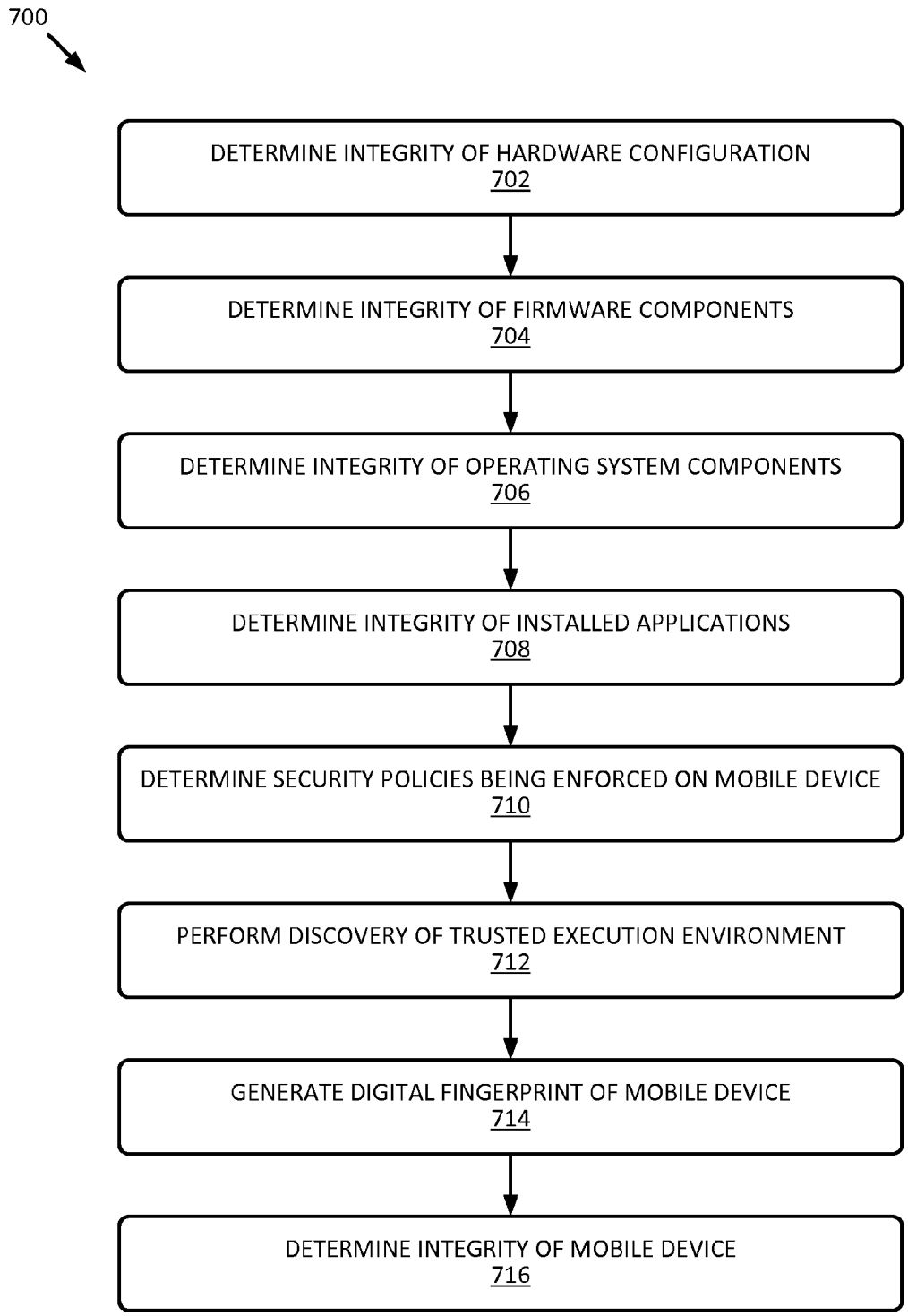
FIG. 7 illustrates an exemplary flow diagram for performing device integrity check according to some embodiments of the invention.

FIG. 7 illustrates a detailed flow diagram 700 of a device integrity check process that can be performed by a verification agent in accordance with some embodiments. The device integrity check can be performed before, concurrently, or after application verification. At block 702, the integrity of the hardware configuration of the mobile device is determined. This may include determining what hardware components (e.g., secure element, SIM card, etc.) are installed on the mobile device. Serial numbers, issuer/manufacturer identification numbers, or other hardware component identifier or unique numbers stored or implemented in the hardware components can be read and verified. The verification agent may also request the hardware components to perform cryptographic operations using cryptographic keys only available to genuine hardware components to determine that the security protocols implemented in the hardware components are functioning properly. In some embodiments, the cryptographic operations can be performed on the hardware component identifier or unique number of the respective components. The result of the cryptographic operations can be used as an attestation value indicating the integrity of the corresponding hardware component. In some embodiments, an attestation value can also be generated for the secure information stored in a secure storage of the mobile device. For example, the contents of the secure storage can be hashed, and the result be used as an attestation value for the secure storage. The attestation values of the various hardware components can also be hashed together to generate a hardware attestation value representing the overall integrity of the hardware configuration of the mobile device.

At block 704, the integrity of the firmware components of the mobile device is determined. The firmware components may include initialization code and boot loader code that are stored in a ROM or write-protected memory. The verification agent may generate a cryptographic measurement (e.g., a hash) of the respective code images of these components. The cryptographic measurements can be used as attestation values indicating the integrity of the respective firmware components. The attestation values of the various firmware components can also be hashed together to generate a firmware attestation value representing the overall integrity of the firmware of the mobile device.

At block 706, the integrity of the operating system components of the mobile device is determined. The operating system components may include a kernel and a network stack. The verification agent may generate a cryptographic measurement (e.g., a hash) of the kernel code image and/or network stack protocols. The cryptographic measurements can be used as an attestation value indicating the integrity of the kernel and/or network stack. The version and build number of the operating system can also be included. The verification agent may also spoof a network request to the network stack to set up a secure communication channel (e.g., SSL, etc.) with the verification agent to verify the functionality of the network stack. The attestation values of the various operating system components can also be hashed together to generate an operating system attestation value representing the overall integrity of the operating system of the mobile device.

At block 708, the integrity of the existing installed applications of the mobile device is determined. Each installed application may have a digital certificate associated with them, and the digital certificate is verified using the techniques described herein. The verification agent may also generate a cryptographic measurement (e.g., a hash) of the code image of each installed application and/or the associated digital certificates. The cryptographic measurements can be used as attestation values indicating the integrity of the respective installed applications. The attestation values of the various installed applications can also be hashed together to generate an application attestation value representing the overall integrity of the installed applications of the mobile device.

At block 710, the verification agent determines the security policies being enforced on mobile device. The security policies being enforced on mobile device can be compared with the requirements of the downloaded application to ensure that the application can be executed in a secure manner. The security policies being enforced on mobile device can also be compared with a security standard defined by the verification agent. In some embodiments, if the security policies being enforce on the mobile device do not meet the requirements of the downloaded application and/or do not meet a defined security standard, the verification agent may modify the security policies on mobile device such that sufficient policies are in place. The verification agent may generate an security policy attestation value indicating the state of the security policies in place on the mobile device.

At block 712, the verification agent can perform a discovery of trusted execution environments to determine if the mobile device has the proper security capabilities for supporting one or more trusted execution environments. For example, the verification agent may determine whether the mobile device has support for to manage a secure element, a SIM card or virtualization technology that can be used for implementing a trusted execution environment. The verification agent may generate a trusted execution environment attestation value indicating the capabilities of the mobile device.

It should be noted that in embodiments in which the mobile device includes a Root of Trust that maintains one or more of the attestation values discussed herein, it may not be necessary for the verification agent to generate the corresponding attestation value if it is readily available from the Root of Trust. In such a scenario, the verification agent may simply obtain the attestation value from the Root of Trust.

At block 714, the verification agent generates a digital fingerprint o the mobile device. the digital fingerprint is a value that represents the current state of the various components of the mobile device, and can be used a measure of the integrity of the mobile device. The digital fingerprint can be, for example, a concatenation of a combination of one or more attestation values described herein, a hash of a combination of one or more the attestation values, or some other cryptographic measurement of a combination of one or more the attestation values.

At block 716, the verification agent determines the integrity of the mobile device. This can be done, for example, by comparing the digital fingerprint of the mobile device against a set of known good or acceptable values stored in or otherwise obtained by the verification agent. If the digital fingerprint matches one of the known good or acceptable values, then the mobile device is determined to be in a trusted state. In some embodiments, the integrity of the mobile device can be determined by sending the digital fingerprint of the mobile device to a trusted entity to determine if the mobile device is in a trusted state.

D. Exemplary Device Enrollment at Server

Figure 8:
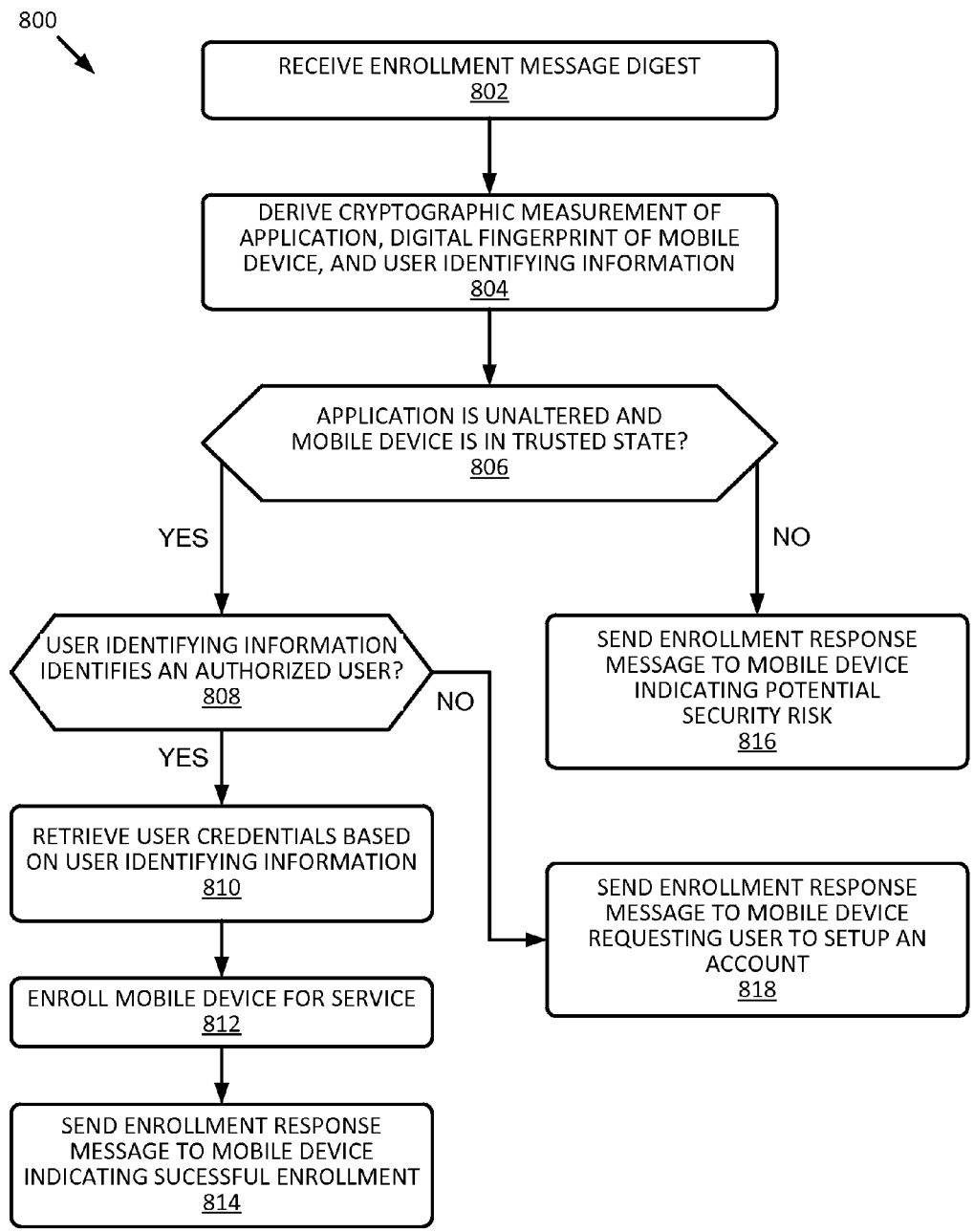
FIG. 8 illustrates an exemplary flow diagram that can be performed by a server for enrolling a mobile device for a service according to some embodiments of the invention.

FIG. 8 illustrates a flow diagram 800 of a secure device service enrollment process that can be performed by a server associated by a service provider or a trusted entity. At block 802, an enrollment message digest is received from a verification agent executing on a mobile device. The enrollment messages includes an association between an application that can be used to access a service via the mobile device, a mobile device, and user identifying information that can be used to identify the user of the mobile device. In embodiments in which the enrollment message digest includes a digital signature signed by the verification agent, the digital signature can be verified and authenticated to ensure that the enrollment message digest was sent from a genuine verification agent.

At block 804, in embodiments in which the enrollment message digest includes a cryptographic measurement of the application and/or the digital fingerprint of the mobile device, these values are derived from the enrollment message digest along with the user identifying information. This can be done, for example, by decrypting the enrollment message digest or by querying a reverse hash lookup database. At block 806, the cryptographic measurement and/or the digital fingerprint are used to determination whether the application received by the mobile device is unaltered and/or whether the mobile device is in a trusted state. For example, the cryptographic measurement and/or the digital fingerprint can be verified against respective trusted or known good values. If the cryptographic measurement of the application and/or the digital fingerprint of the mobile device are not verified (i.e. does not match any trusted or known good values), at block 816, an enrollment response message is sent to the mobile device to indicate that the device enrollment has failed due to a potential security risk of the application and/or mobile device.

If the cryptographic measurement of the application and/or the digital fingerprint of the mobile device are verified to match trusted or known good values, at block 808, the user identifying information is used to determine if the user of the mobile device is an authorized user of the service provided by the service provider. If the user identifying information does not match the information of any authorized user of the service, then at block 818, an enrollment response message is sent to the mobile device to indicate that the device enrollment has failed, and to request the user to set up an account with the service provider.

If an authorized user matching the user identifying information is found, then at block 810, the user credentials for accessing the service are retrieved based on the user identifying information. The mobile device is then enrolled for access to the service at block 812, for example, by associating information about the mobile device with the user account. At block 814, an enrollment response message is sent to the mobile device to indicate successful device enrollment. In some embodiments, the enrollment response message may include the retrieved user credentials or other user account related information that can be used to facilitate the provisioning or installation of the application on the mobile device.

In some embodiments, the digital fingerprint of the mobile device can be stored at the service provider. The digital fingerprint of the mobile device can be used to detect modification of the mobile device when the mobile device is subsequently used to access the service from the service provider. For example, when the mobile device is used to access the service, the verification agent or the application may generate a digital fingerprint of the mobile device and use the digital fingerprint as part of the user credentials to gain access to the service. The service provide may compare the received digital fingerprint of the mobile device against the digital fingerprint that was previously stored at the service provider during device enrollment. A mismatch between the digital fingerprints may indicate that the mobile device has been altered subsequent to the device enrollment process, and the security of the mobile device may have been comprised. In such a scenario, the service provider may deny access to the service if it is determined that the mobile device is no longer in a trusted state.

In some embodiments, to avoid disruption of service, the digital fingerprint can be generated over only a selected number of components of the mobile device which are not expected to change often during the normal course of usage. For example, such components may include the firmware, operating system, and the security policies enforced on the mobile device, etc. In the event that any of such components are updated by an authorized entity (e.g., an operating system upgrade pushed to the mobile device from a mobile network operator), the device enrollment process described herein can be repeated to update the digital fingerprint stored at the service provider by re-enrolling the mobile device with the service provider.

It should be appreciated that the specific steps illustrated in FIGS. 5-8 provide examples of processes performed according to some embodiments of the present invention. Other sequences of steps may also be performed accordingly in alternative embodiments. For example, alternative embodiments of the present invention may perform the steps shown in FIGS. 5-8 in a different order. Moreover, the individual steps illustrated in in FIGS. 5-8 may include multiple sub-steps that may be performed in various sequences as appropriate to the individual step. Furthermore, additional steps may be added or removed depending on the particular embodiments. One of ordinary skill in the art would recognize and appreciate many variations, modifications, and alternatives of these processes.

Figure 9:
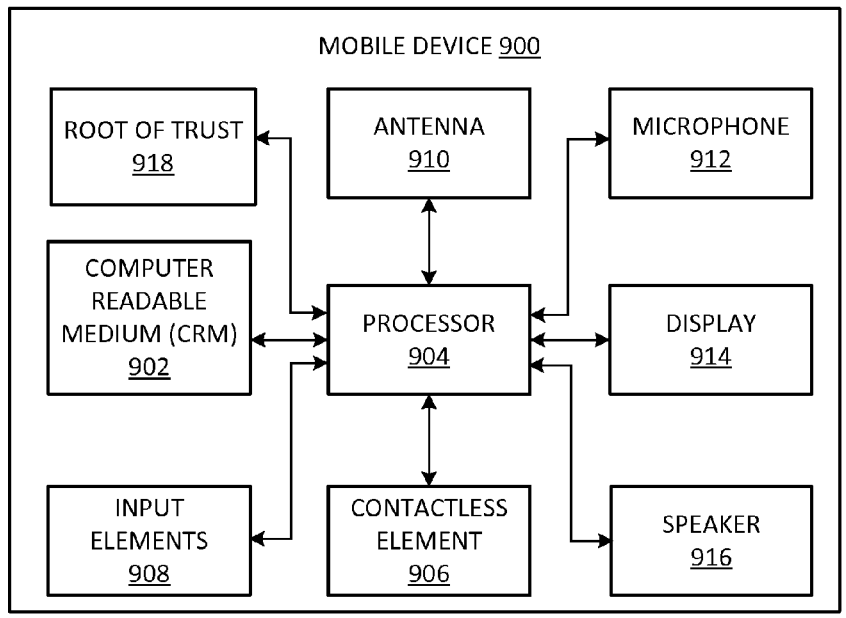
FIG. 9 illustrates a block diagram of an exemplary mobile device according to some embodiments of the invention.

FIG. 9 illustrates at least some of the elements of an exemplary mobile device 900 in accordance with some embodiments. Mobile device 900 may be a mobile phone, a tablet, a PDA, a laptop or any such electronic device capable of communicating and transferring data or control instructions via a wireless network (e.g., cellular network, internet, etc.) and short range communications. Mobile device 900 may include the processor 904 (e.g., a microprocessor) for processing the functions of mobile device 900 (e.g., a phone) and a display 914 to allow a user to see messages (e.g., alert messages), phone numbers, images, and other information. Mobile device 900 may further include input elements 908 to allow the user to input information into the device (e.g., using a keypad, touch screen, mouse, etc.), a speaker 916 to allow the user hear voice communication, music, etc., and a microphone 912 to allow the user transmit voice through the device. Mobile device 900 may also include an antenna 902 for wireless data transfer.

In some embodiments, mobile device 900 may allow the user to communicate with one or more entities, such as the entities described in FIG. 1. Mobile device 900 may act as a payment device that may be used to make payments, conduct a transaction, a communication device to allow a user to log on to a website and download an application, etc. Mobile device 900 may also allow the user to download and install security sensitive applications on the mobile device 900. The exemplary mobile device 900 may comprise a computer readable medium (CRM) 902 comprising code executable by the processor 904 for implementing methods and processes using embodiments of the invention. The computer readable medium 902 may be in the form of a memory that stores data and could be internal to the device or hosted remotely (i.e., cloud) and accessed wirelessly by the device. A contactless element 906 may be capable of transmitting and receiving wireless data or instructions using a short range wireless communications capability.

Figure 10:
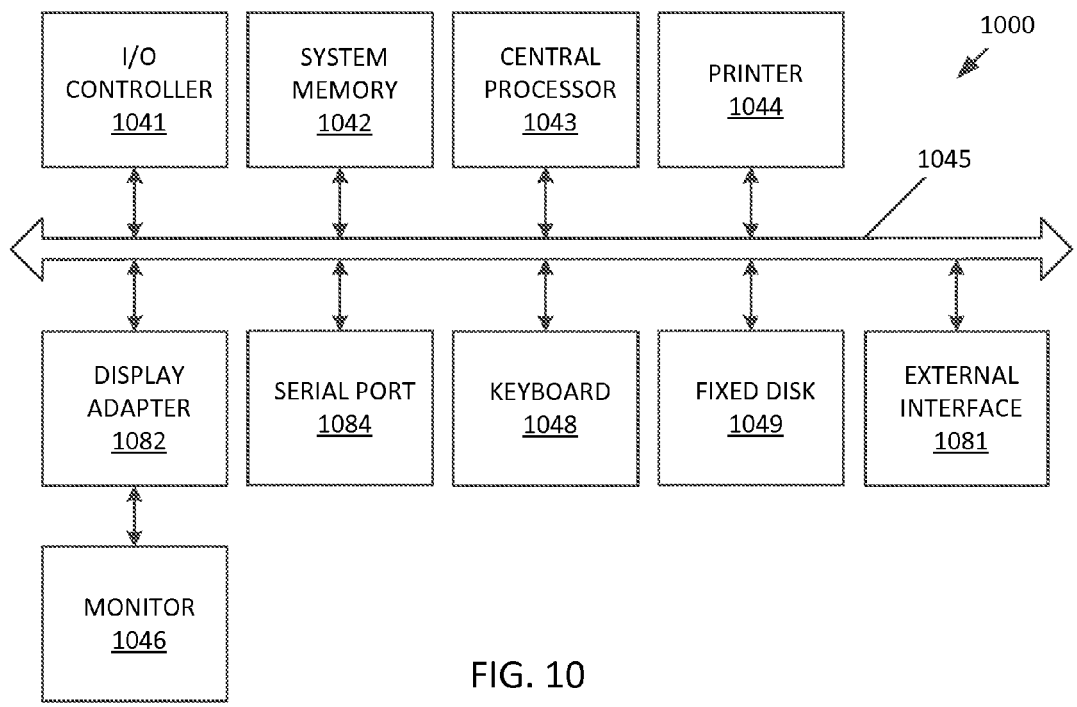
FIG. 10 illustrates a block diagram of an exemplary server computer in accordance with some embodiments of the invention.

FIG. 10 is a high level block diagram of a computer system that may be used to implement any of the entities or components described herein. The subsystems shown in FIG. 10 are interconnected via a system bus 1002. Additional subsystems may include a printer 1010, keyboard 1018, fixed disk 1020, and monitor 1012, which is coupled to display adapter 1014. Peripherals and input/output (I/O) devices, which couple to I/O controller 1004, can be connected to the computer system by any number of means known in the art, such as a serial port. For example, serial port 1016 or external interface 1022 can be used to connect the computer apparatus to a wide area network such as the Internet, a mouse input device, or a scanner. The interconnection via system bus 1002 allows the central processor 1008 to communicate with each subsystem and to control the execution of instructions from system memory 1006 or the fixed disk 1020, as well as the exchange of information between subsystems. The system memory 1006 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method for enrolling a mobile device for services, the method comprising:
   receiving, by the mobile device, an application package including a verification agent and a first application used for accessing a first service via the mobile device;
   determining, by the mobile device executing the verification agent received as part of the application package, a first application authenticity and a first application integrity of the first application;
   determining, by the mobile device executing the verification agent received as part of the application package, a first device integrity of the mobile device for the first application, wherein the first device integrity for the first application is determined over a first set of components of the mobile device by generating a digital fingerprint that includes a concatenation of an attestation value corresponding to a security policy enforced by the mobile device and two or more attestation values selected from a first attestation value corresponding to a hardware component of the mobile device, a second attestation value corresponding to a firmware component of the mobile device, or a third attestation value corresponding to an operating system of the mobile device;

in response to determining that the first application is authentic and unaltered, and that the mobile device is in a trusted state for the first application, generating, by the mobile device executing the verification agent received as part of the application package, a message digest associating the first application, the mobile device, and user identifying information of a user of the mobile device;

sending, by the mobile device, the message digest to a server associated with a service provider to enroll the mobile device for the first service;

receiving, by the mobile device, the first service;

receiving, by the mobile device, a second application used for accessing a second service over the network;

determining, by the mobile device, that the verification agent received as part of the application package for the first application is compatible with the second application; and determining, by the mobile device, that a second device integrity of the mobile device for the second application is to be determined over a second set of components of the mobile device that includes at least one component that is different than the first set of components based on a manifest of the second application indicating the second application has a different security sensitivity requirement than the first application;

determining, by the mobile device, the second device integrity, wherein the second device integrity is used for enrolling the mobile device for the second service; and receiving, by the mobile device, the second service.

2. The method of claim 1, wherein the message digest is generated using one or more of a cryptographic measurement of the first application, or the digital fingerprint of the mobile device.

3. The method of claim 1, wherein determining the first application integrity of the first application includes:
generating a cryptographic measurement of the first application;
sending the cryptographic measurement to a verification server; and
receiving an application verification result indicating whether the first application is unaltered.

4. The method of claim 1, wherein determining the first device integrity includes:
sending the digital fingerprint of the mobile device to a verification server; and
receiving a device verification result indicating whether the mobile device is in a trusted state.

5. A method for enrolling a mobile device for services, the method comprising:
receiving, by a server, a first enrollment message digest for a first service, wherein the first enrollment message digest is generated by a verification agent in response to the verification agent determining that the mobile device is in a trusted state for a first application based on a first device integrity of the mobile device determined over a first set of components of the mobile device, the verification agent being part of an application package downloaded to the mobile device, the application package including both the verification agent and the first application used by the mobile device to access the first service;

deriving, by the sever from the first enrollment message digest, a cryptographic measurement of the first application downloaded onto the mobile device, a digital fingerprint of the mobile device, and user identifying information of a user of the mobile device, wherein the digital fingerprint is a concatenation of an attestation value corresponding to a security policy enforced by the mobile device and two or more attestation values selected from a first attestation value corresponding to a hardware component of the mobile device, a second attestation value corresponding to a firmware component of the mobile device, or a third attestation value corresponding to an operating system of the mobile device;

using, by the sever, the cryptographic measurement to determine whether the first application is unaltered;

using, by the sever, the digital fingerprint to determine whether the mobile device is in a trusted state;

in response to determining that the first application is unaltered and that the mobile device is in a trusted state, enrolling, by the sever, the mobile device for the first service, wherein the first service is received by the mobile device after enrollment for the first service;

receiving, by the server, a second enrollment message digest for a second service that is accessed by a second application, wherein the second enrollment message digest is generated by the verification agent in response to the verification agent determining that the mobile device is in a trusted state for the second application based on a second device integrity of the mobile device determined over a second set of components of the mobile device that includes at least one component that is different than the first set of components, wherein the second set of components for the second device integrity is determined based on a manifest of the second application indicating the second application has a different security sensitivity requirement than the first application; and enrolling, by the sever, the mobile device for the second service based on the second enrollment message digest, wherein the second service is received by the mobile device after enrollment for the second service.

6. The method of claim 5, wherein the mobile device is determined to be in the trusted state by comparing the digital fingerprint against a set of one or more trusted values.

7. The method of claim 5, further comprising:
using the user identifying information to retrieve user credentials of an account of the user; and
sending, to the mobile device, the user credentials to provision the mobile device.

8. The method of claim 5, further comprising:
storing the digital fingerprint of the mobile device;
receiving a subsequent digital fingerprint of the mobile device when the mobile device is used to access the first service after the mobile device has been enrolled;
comparing the subsequent digital fingerprint with the stored digital fingerprint; and
denying the mobile device access to the first service when the subsequent digital fingerprint does not match the stored digital fingerprint.

9. A mobile device comprising:
a processor; and
a computer readable storage medium storing code, which when executed by the processor, causes the mobile device to:

generate, by a verification agent downloaded onto the mobile device, a cryptographic measurement of a first application downloaded onto the mobile device, the verification agent and the first application being part of an application package downloaded onto the mobile device;

generate, by the verification agent downloaded onto the mobile device, a first digital fingerprint of the mobile device based on a first set of components of the mobile device;

generate, by the verification agent downloaded onto the mobile device, a first enrollment message digest based on the cryptographic measurement of the first application, the first digital fingerprint of the mobile device, and user identifying information of a user of the mobile device, wherein the first digital fingerprint is a concatenation of an attestation value corresponding to a security policy enforced by the mobile device and two or more attestation values selected from a first attestation value corresponding to a hardware component of the mobile device, a second attestation value corresponding to a firmware component of the mobile device, or a third attestation value corresponding to an operating system of the mobile device;

send the first enrollment message digest to a server associated with a service provider to enroll the mobile device for access to a first service associated with the first application provided by the service provider, wherein the first service is received by the mobile device after enrollment for the first service;

generate, by the verification agent downloaded onto the mobile device, a second enrollment message digest for a second service that is accessed by a second application, the second enrollment message digest including a second digital fingerprint of the mobile device based on a second set of components of the mobile device having at least one component that is different than the first set of components, wherein the second set of components for the second digital fingerprint is determined based on a manifest of the second application indicating the second application has a different security sensitivity requirement than the first application; and send the second enrollment message digest to the server to enroll the mobile device for access to the second service associated with the second application, wherein the second service is received by the mobile device after enrollment for the second service.

10. The mobile device of claim 9, wherein the first enrollment message digest is generated only when both the first application is determined to be unaltered, and the mobile device is determined to be in a trusted state.

11. The mobile device of claim 10, wherein the first application is determined to be unaltered by sending the cryptographic measurement of the first application to a verification server, or by comparing the cryptographic measurement of the first application with a known good value.

12. The mobile device of claim 10, wherein the mobile device is determined to be in a trusted state by sending the first digital fingerprint of the mobile device to a verification server, or by comparing the first digital fingerprint of the mobile device against a set of one or more trusted values.

13. The mobile device of claim 9, wherein the computer readable storage medium further stores code, which when executed by the processor, causes the mobile device to:
install the received first application after receiving an enrollment response indicating that the mobile device has been enrolled for the first service.

14. The method of claim 1, further comprising:
using the verification agent received as part of the application package for the first application to determine a second application authenticity and a second application integrity of the second application.

15. The method of claim 5, wherein one or more of the attestation values are stored in a set of one or more attestation registers implemented in a root of trust of the mobile device.

16. The method of claim 1, wherein one or more of the attestation values are stored in a set of one or more attestation registers implemented in a root of trust of the mobile device.

17. The mobile device of claim 9, wherein one or more of the attestation values are stored in a set of one or more attestation registers implemented in a root of trust of the mobile device.

* * * * *